United States Patent
Luck

(10) Patent No.: US 11,131,483 B1
(45) Date of Patent: Sep. 28, 2021

(54) HEAT TRANSFER DEVICE FOR SOLAR HEATING

(71) Applicant: John Howard Luck, Windsor (CA)

(72) Inventor: John Howard Luck, Windsor (CA)

( * ) Notice: Subject to any disclaimer, the term of this patent is extended or adjusted under 35 U.S.C. 154(b) by 0 days.

(21) Appl. No.: 16/984,681

(22) Filed: Aug. 4, 2020

(51) Int. Cl.
*F24S 20/66* (2018.01)
*F24S 10/30* (2018.01)

(52) U.S. Cl.
CPC ............... *F24S 20/66* (2018.05); *F24S 10/30* (2018.05)

(58) Field of Classification Search
CPC ............. F24S 20/66; F24S 20/69; F24S 20/30
USPC ........................................................ 126/654
See application file for complete search history.

(56) References Cited

U.S. PATENT DOCUMENTS

| | | | | |
|---|---|---|---|---|
| 4,183,350 A | * | 1/1980 | Staudacher | F24S 20/66 126/633 |
| 4,228,787 A | * | 10/1980 | Steinemann | E04B 1/7612 126/632 |
| 2018/0209689 A1 | * | 7/2018 | Ipposhi | F24H 4/04 |
| 2018/0363951 A1 | * | 12/2018 | Luck | F24S 10/30 |
| 2020/0141068 A1 | * | 5/2020 | Pouteau | F24T 10/10 |

* cited by examiner

*Primary Examiner* — Steven B Mcallister
*Assistant Examiner* — Aaron H Heyamoto

(57) ABSTRACT

A method for improving the efficiency of a solar heating system based on absorbing heat from solar radiation through the surface of an exposed tube to a liquid. The heat transfer device makes use of this fluid to transfer heat from the outside of the wall to the inside of the wall. The inside wall is then used to heat air that is passed over it, and that air is then used to heat up a heat storage system.

2 Claims, 27 Drawing Sheets ved. This device is
HEAT TRANSFER DEVICE FOR SOLAR HEATING

BACKGROUND OF THE INVENTION

The present invention relates to the field of solar heating. Solar heating using heat transfer through an outside wall has been used in the past. Traditionally the amount of heat and rate of heat transfer has been limited by the thickness of the wall and the thermal coefficient of heat transfer in concrete.

SUMMARY OF THE INVENTION

It is the object of this invention to provide a method to improve the rate and quantity of heat transfer through a wall that has solar energy falling on its outer surface. This invention discloses a method of improving the rate and quantity of heat transferred through a concrete wall, through the use of a fluid based heat transfer device. This device is located with one of its surfaces outside of the concrete wall and for the purpose of ease of use, the heat transfer device is located on and inside a heat transfer block also made of concrete or typical concrete blocks. These heat transfer blocks can be used to construct a block wall of a building.

It is possible to manufacture the heat transfer block from two decorative concrete blocks that are joined together (by mortar, etc.) and have holes or slots drilled in them to allow one side of the tube loop to be on an outside surface and are then mortared into place with the other side of the tube loop near the back wall of the combined blocks.

The complete solar heating system consists of several of the heat transfer devices located in a cement wall, or a wall built from heat transfer blocks, with an outer glass panel to retain heat and an automated screen system to reduce loss of heat and a fan/duct system that takes the heat from the inside of the wall section to a heat storage location.

BRIEF DESCRIPTION OF THE DRAWINGS

These and other objects of the invention will become apparent from reading a detailed description taken in conjunction with the drawings, in which.

DETAILED DESCRIPTION

Figure 1:
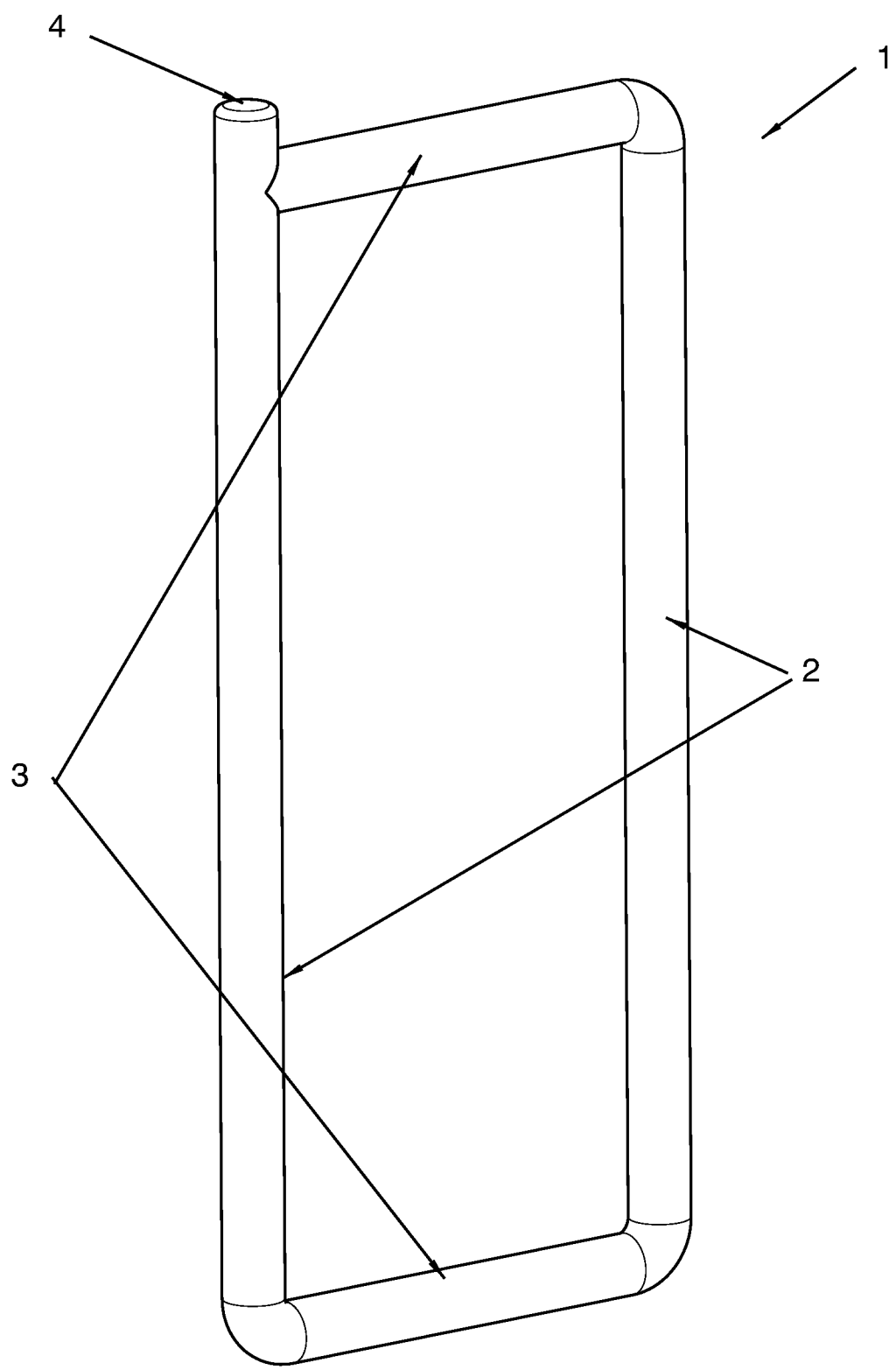
FIG. 1 is a drawing showing a first version of the heat transfer device.

With reference to FIG. 1, a heat transfer device, 1, is shown. The major components are: a metal tube formed into a loop with vertical sections, 2, horizontal sections, 3, and a metal cap, 4. The metal tube, 1, can be made from metals such as steel, aluminum, copper, brass, PVC, etc.

Figure 2:
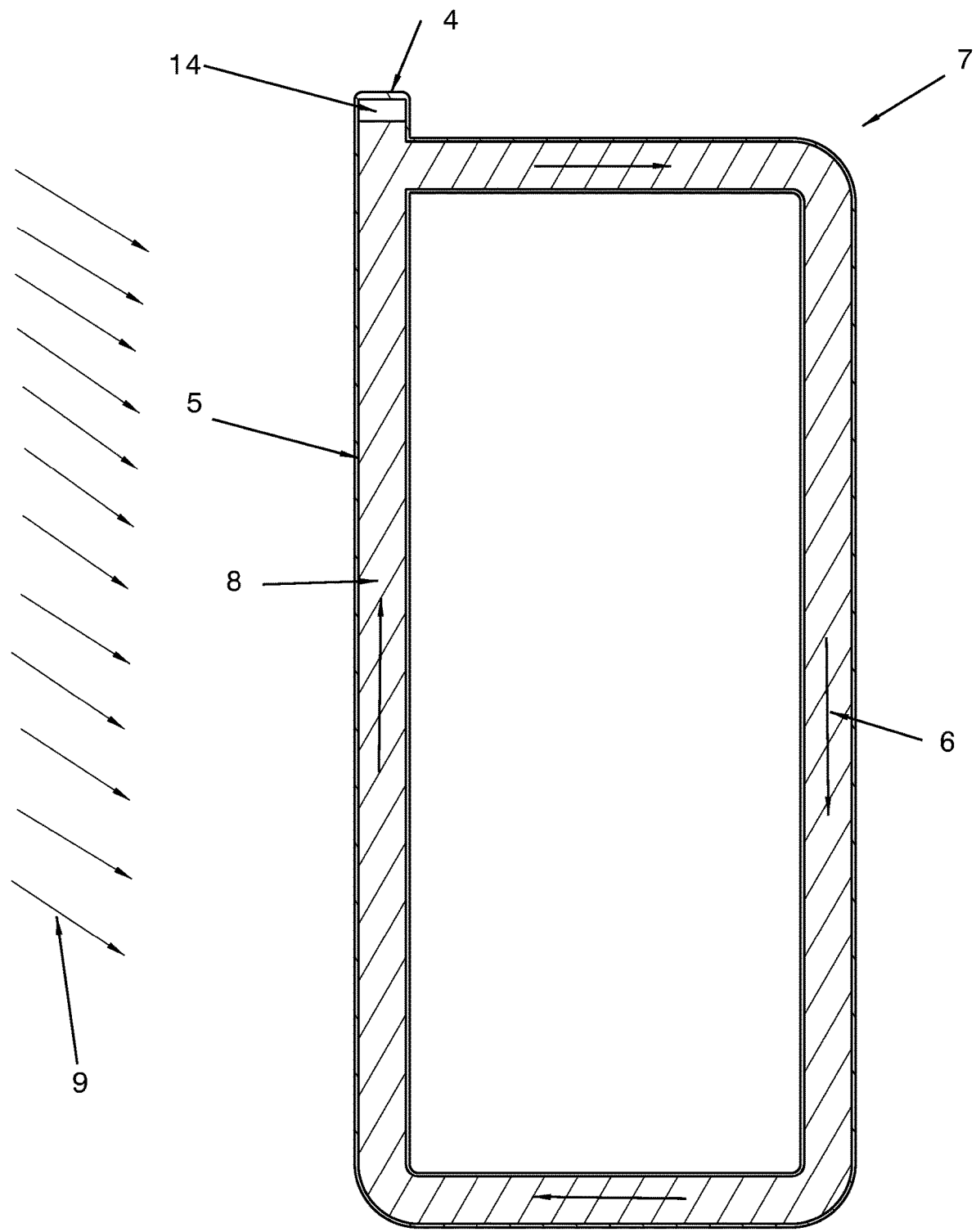
FIG. 2 is a drawing showing a cross section view through the heat transfer device of FIG. 1.

FIG. 2 shows a cross section view, 7, through the heat transfer device, 1, of FIG. 1. The components: a metal tube, 5, a metal cap, 4, and the fluid, 8, that fills most of the metal tube, 5, leaving a void, 14, above the fluid, 8, that allows for expansion of the fluid, 8. The fluid may be any suitable fluid, 8, that can perform in a liquid state over the temperature range encountered during operation, which is estimated to range from −50° to +95° C. Suitable fluids, 8, include, water with antifreeze, alcohols, etc. Also shown in the figure are direction arrows, 6, showing the direction of movement of the fluid, 8, as the fluid, 8, is heated by sunlight, 9, falling on the wall of the tube, 5.

Figure 3:
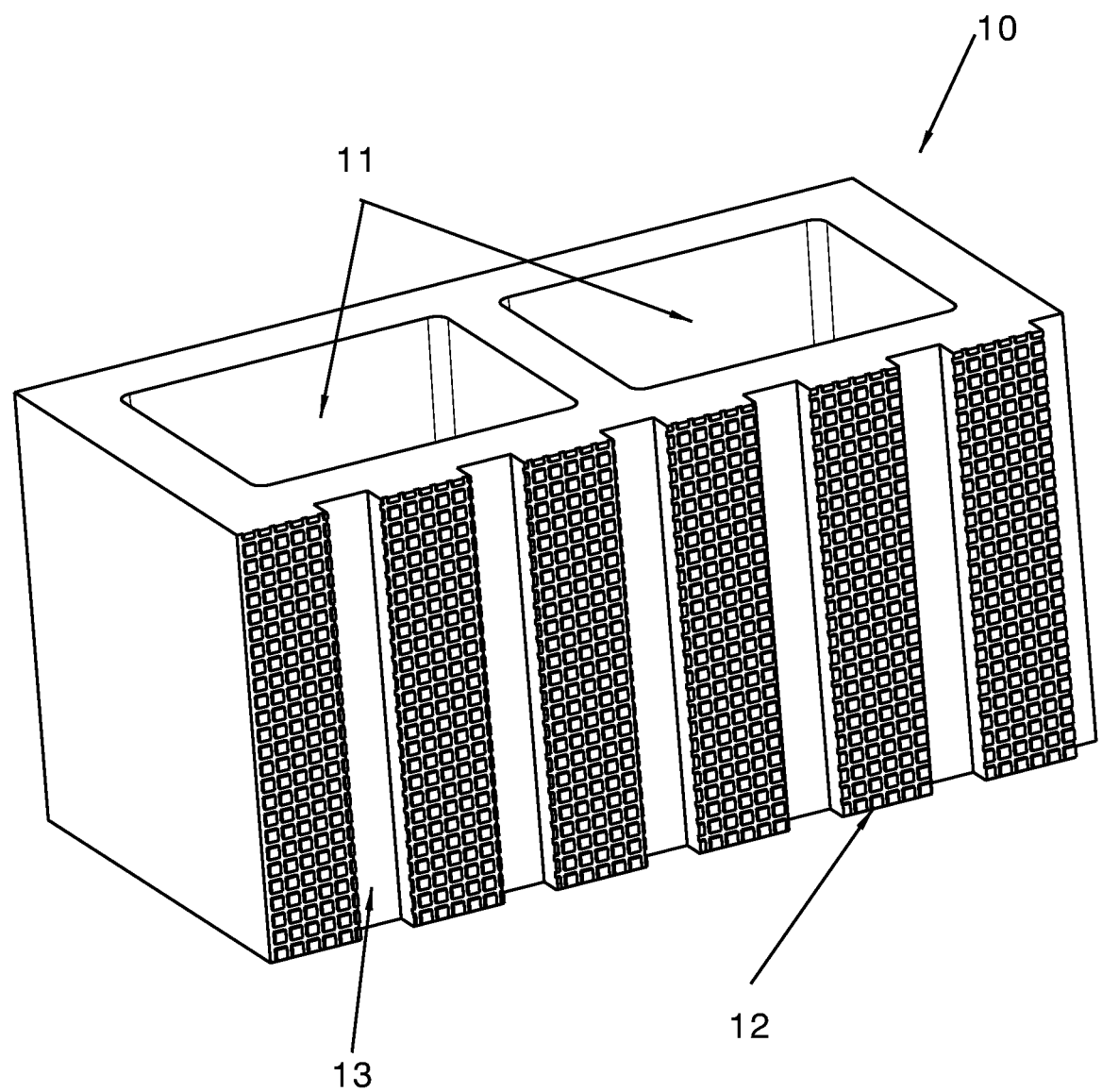
FIG. 3 is a drawing showing a typical decorative concrete block.

With reference to FIG. 3, a typical concrete decorative block, 10, is shown containing, two hollow sections, 11, the front grooves, 13, and the textured surface, 12. Typically these decorative concrete blocks are a nominal 16 inches long by 8 inches high and 8 inches thick.

Figure 4:
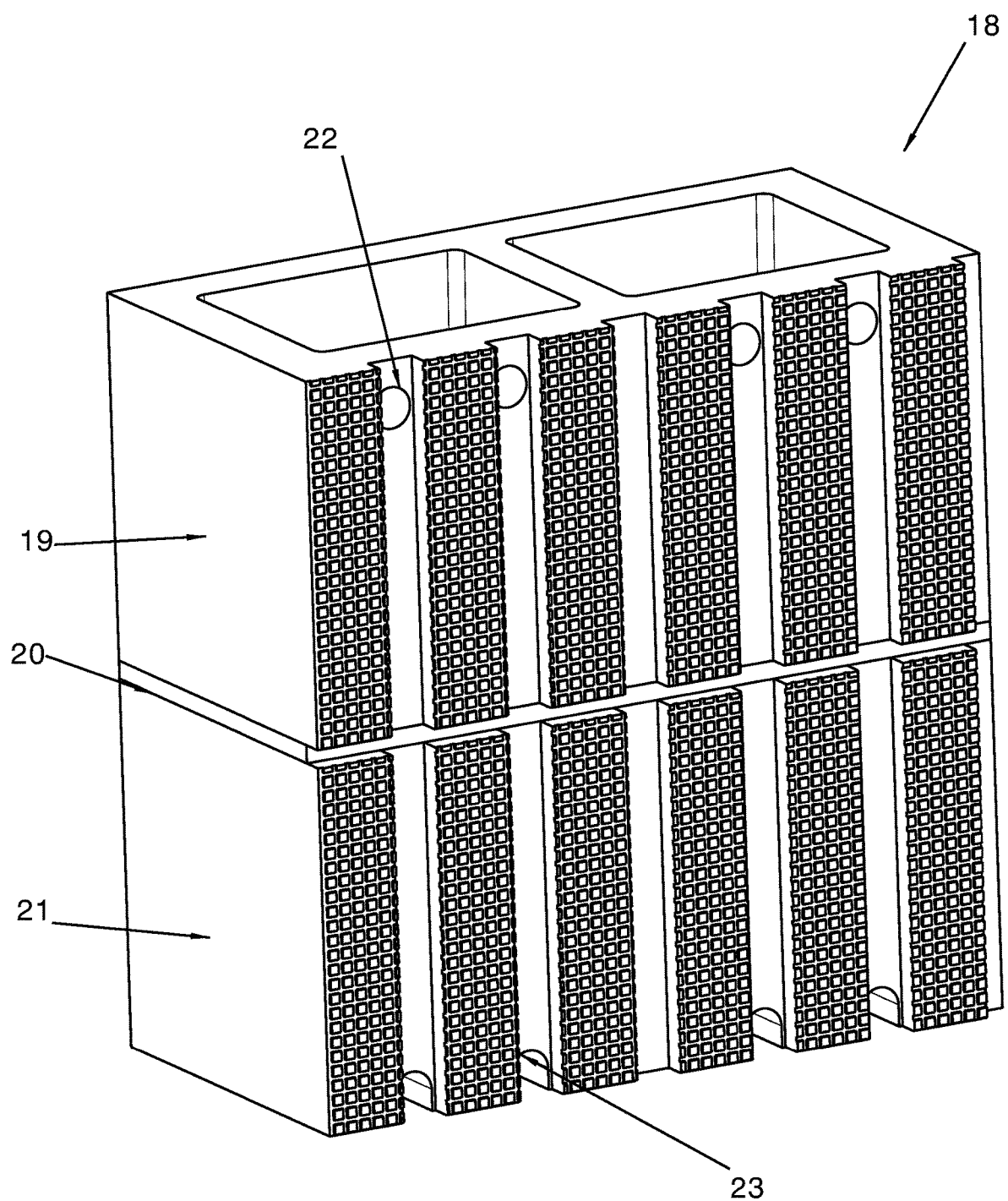
FIG. 4 is a drawing showing two of the typical decorative concrete blocks of FIG. 3 joined together with holes to accommodate the tubing entry points.

FIG. 4 shows a double block assembly, 18, this assembly consists of a top block, 19, with holes, 22, drilled through the front wall of the block, 19, a mortar layer, 20, and a bottom block, 21, with slots, 23, made through the front wall of the block, 21.

Figure 5:
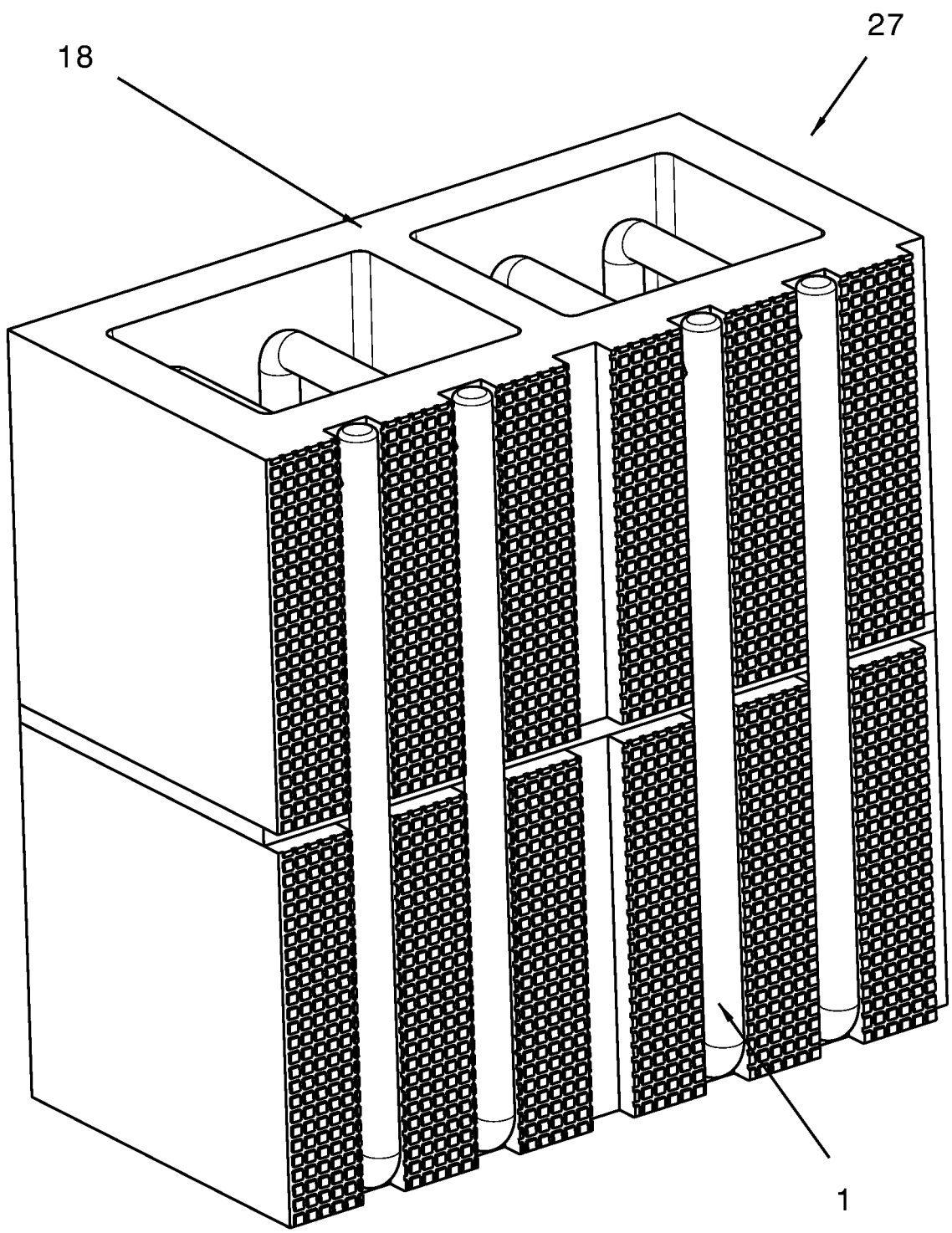
FIG. 5 is a drawing showing the combined typical decorative blocks of FIG. 4 that contain 4 the heat transfer devices of FIG. 1 forming a heat transfer block.

With reference to FIG. 5 the assembly, 27, of the double block assembly, 18, of FIG. 4, has 4 heat transfer devices, 1, installed in the double block assembly, 18. The heat transfer devices, 1, are mounted such that they are located in the decorative grooves, very close to the bottom of the grooves. The presence of the grooves provides some protection to the heat transfer devices, 1, against damage during shipping and handling.

Figure 6:
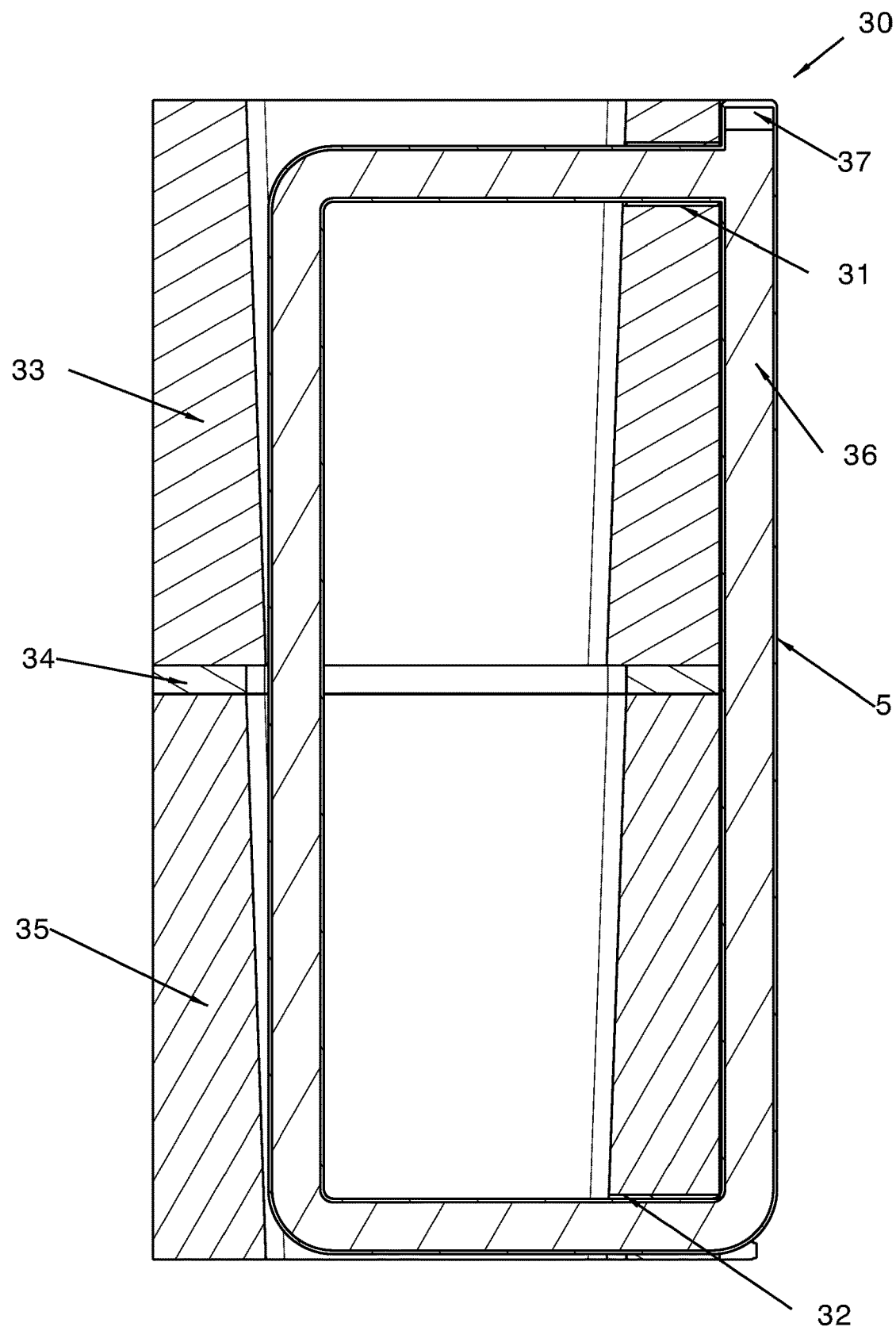
FIG. 6 is a drawing showing a cross section through the heat transfer block of FIG. 5

FIG. 6 shows a cross section through the double block assembly, 27, of FIG. 5. In this view, 30, the top block, 33, the mortar, 34, the bottom block, 35, the metal tube, 5, the fluid, 36, the upper flexible seal, 31, and the lower flexible seal, 32. These seals, 31 and 32, can be made from flexible materials, such as plumbers putty, silicone rubber, etc.

Figure 7:
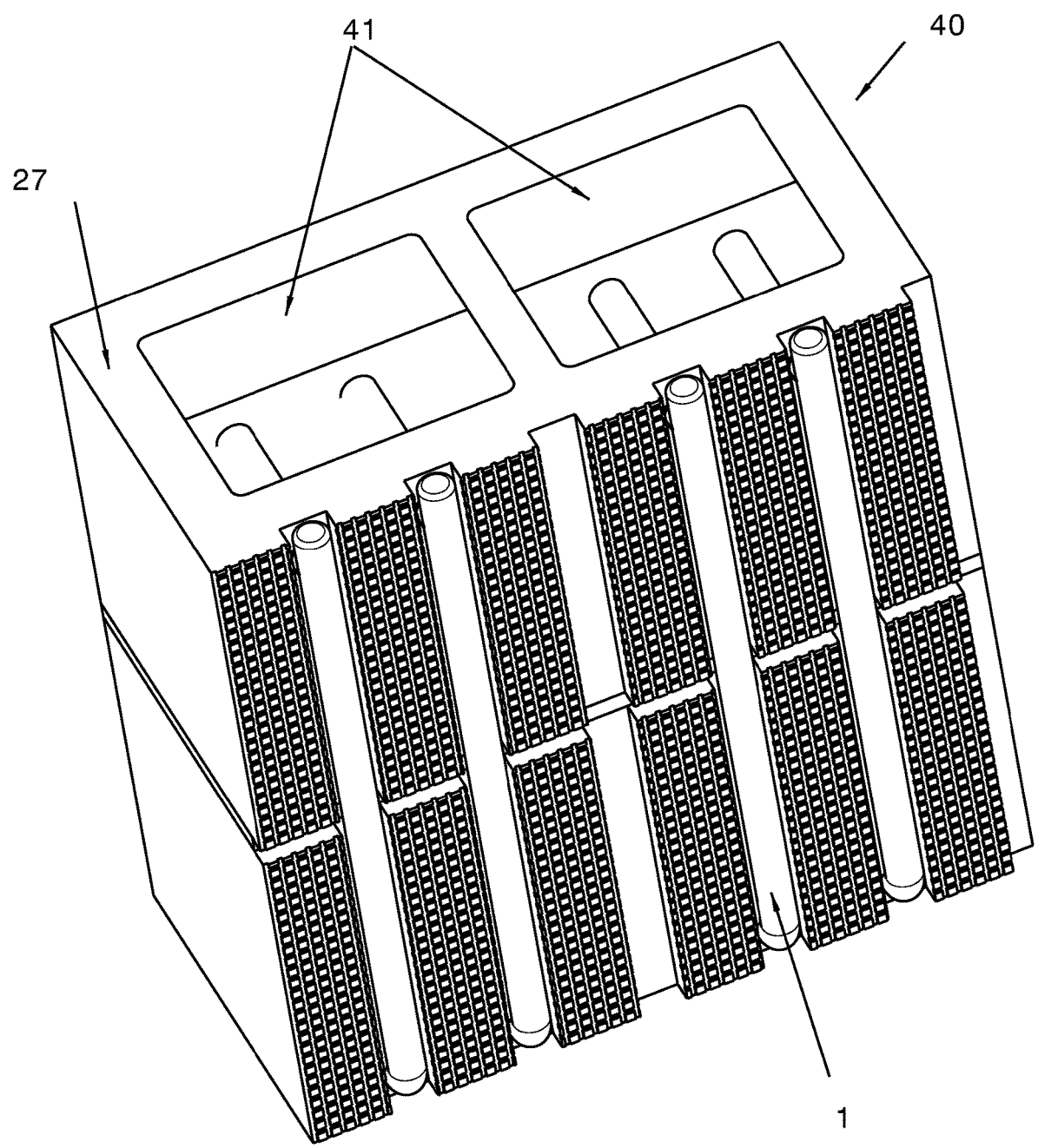
FIG. 7 is a drawing showing the heat transfer block of FIG. 5 partially filled with mortar.

With reference to FIG. 7 the first version of the heat transfer block, 40, is shown in a finished form by partially filling the openings in the double block assembly, 27, with mortar, 41, thereby enclosing the rear portion of the heat transfer device, 1, and providing a thermal path to the rear wall of the heat transfer block, 40.

Figure 8:
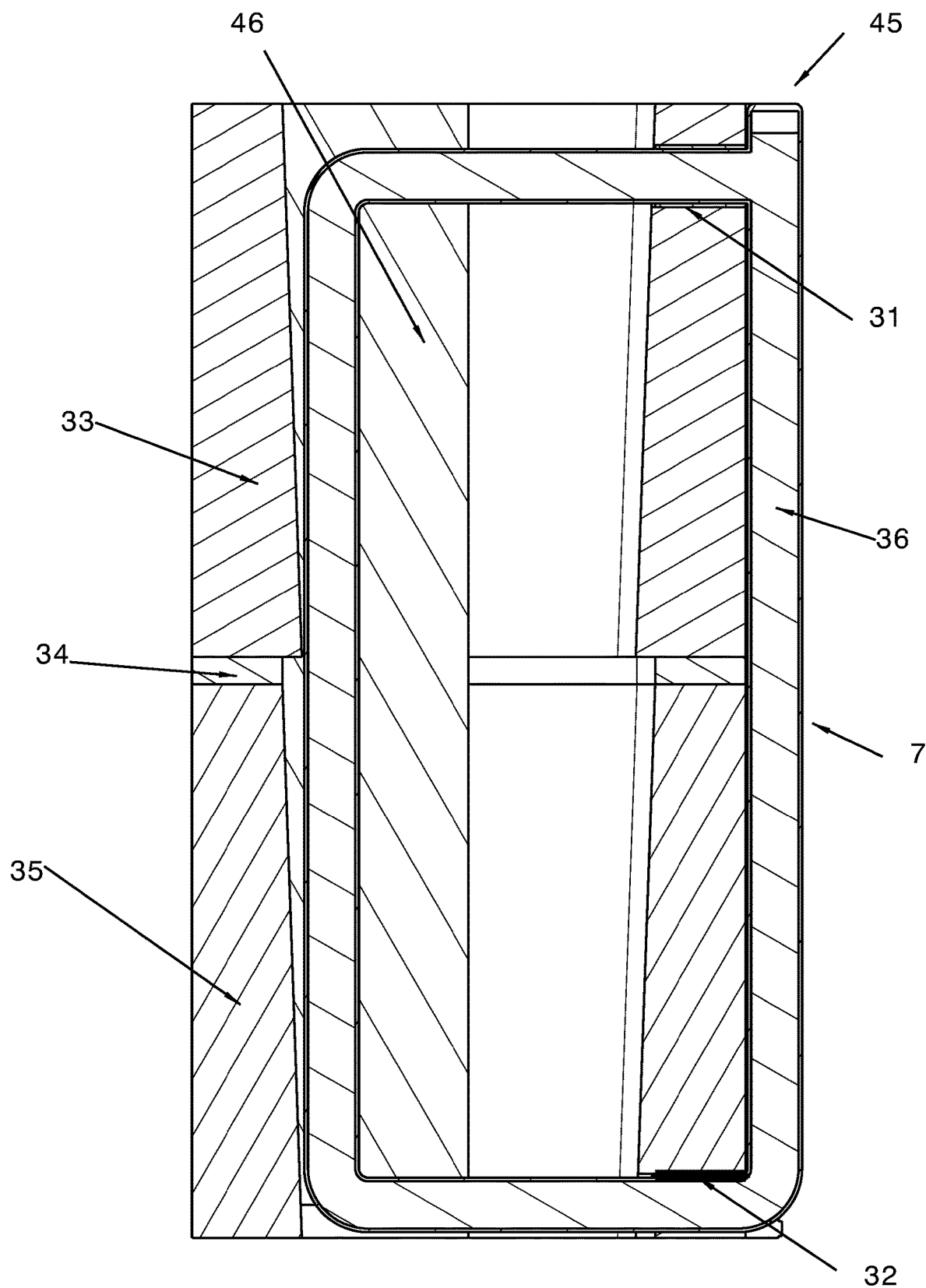
FIG. 8 is a drawing showing a cross section through the heat transfer block of FIG. 7.

FIG. 8 shows a cross section, 45, through the heat transfer block, 40, of FIG. 7. In this cross section view, 45, the top block, 33, the mortar, 34, the bottom block, 35, the metal tube, 7, the fluid, 36, the upper flexible seal, 31, and the lower flexible seal, 32. Also shown is the partial fill mortar, 46, against the back wall of the first version of the heat transfer block, 40.

Figure 9:
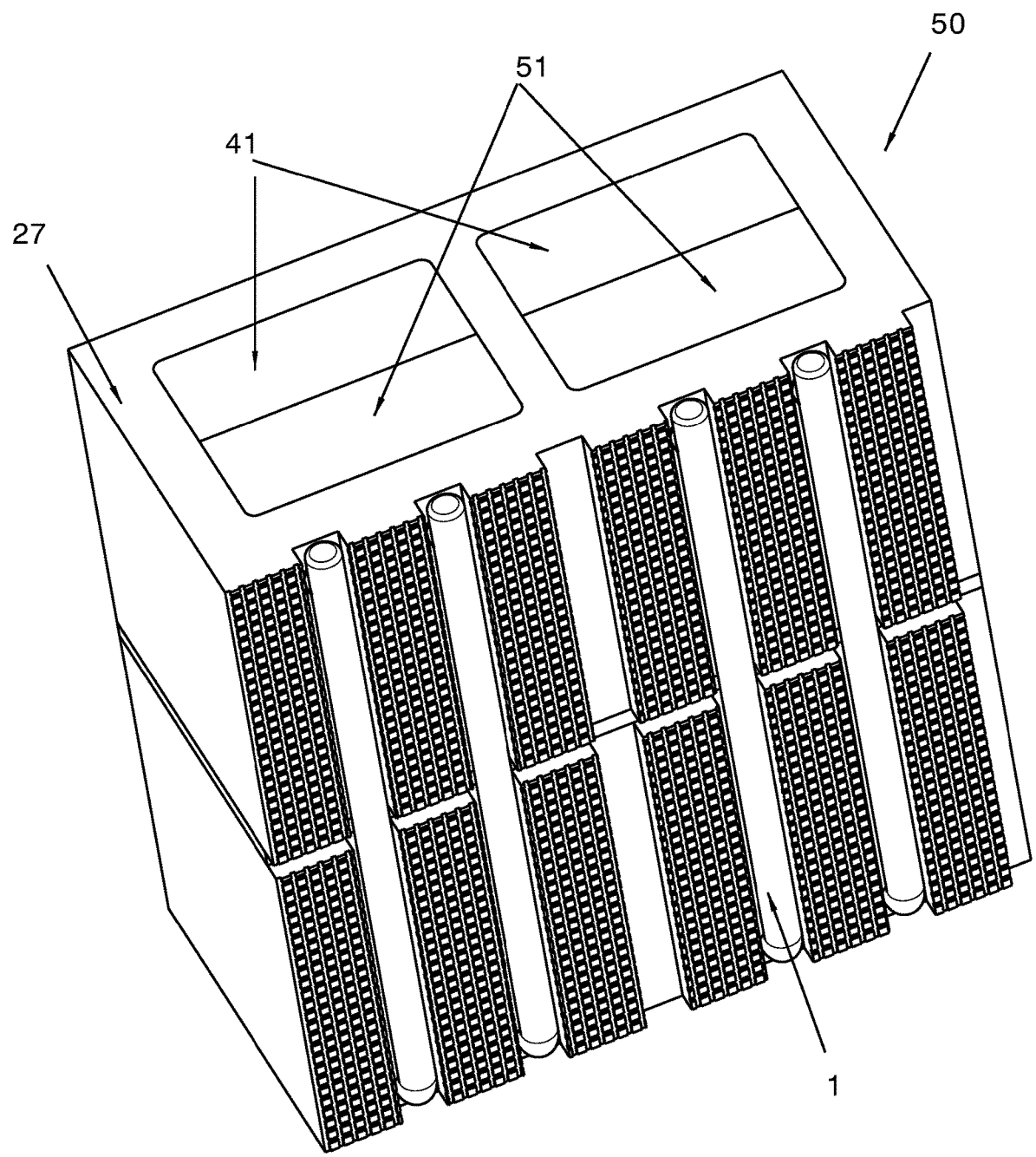
FIG. 9 is a drawing showing the heat transfer block of FIG. 7 with plugs added above the top portion of the heat transfer devices.

With reference to FIG. 9 the first version of the heat transfer block, 50, is shown in a finished form by partially filling the openings in the double block assembly, 27, with mortar, 41, thereby enclosing the rear portion of the heat transfer device, 1, and providing a thermal path to the rear wall of the heat transfer block, 40. As well the remaining opening in the heat transfer block, 40, not filled with mortar, 41, is blocked with a plug, 51, made from Styrofoam, plastic, etc. to prevent vertical air flow in the first version of the heat transfer block, 50.

Figure 10:
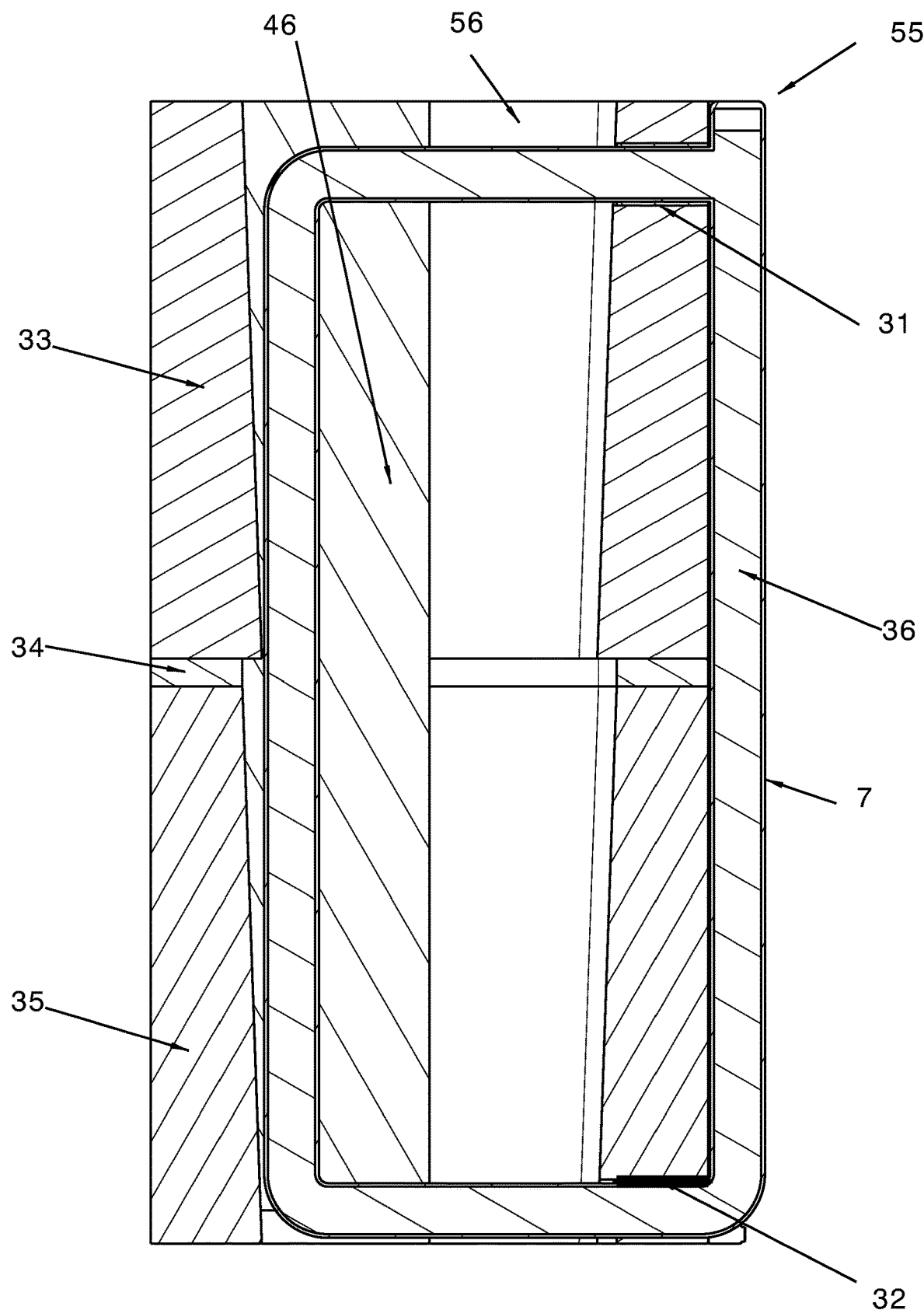
FIG. 10 is a cross section view of the heat transfer block of FIG. 9.

FIG. 10 shows a cross section, 55, through the heat transfer block, 50, of FIG. 9. In this cross section view, 55, the top block, 33, the mortar, 34, the bottom block, 35, the metal tube, 7, the fluid, 36, the upper flexible seal, 31, and the lower flexible seal, 32. Also shown is the partial fill mortar, 46, against the back wall of the first version of the heat transfer block, 50. As well the remaining opening in the heat transfer block, 50, not filled with mortar, 46, is blocked with a plug, 56, made from Styrofoam, plastic, etc. to prevent vertical air flow in the first version of the heat transfer block, 50.

Figure 11:
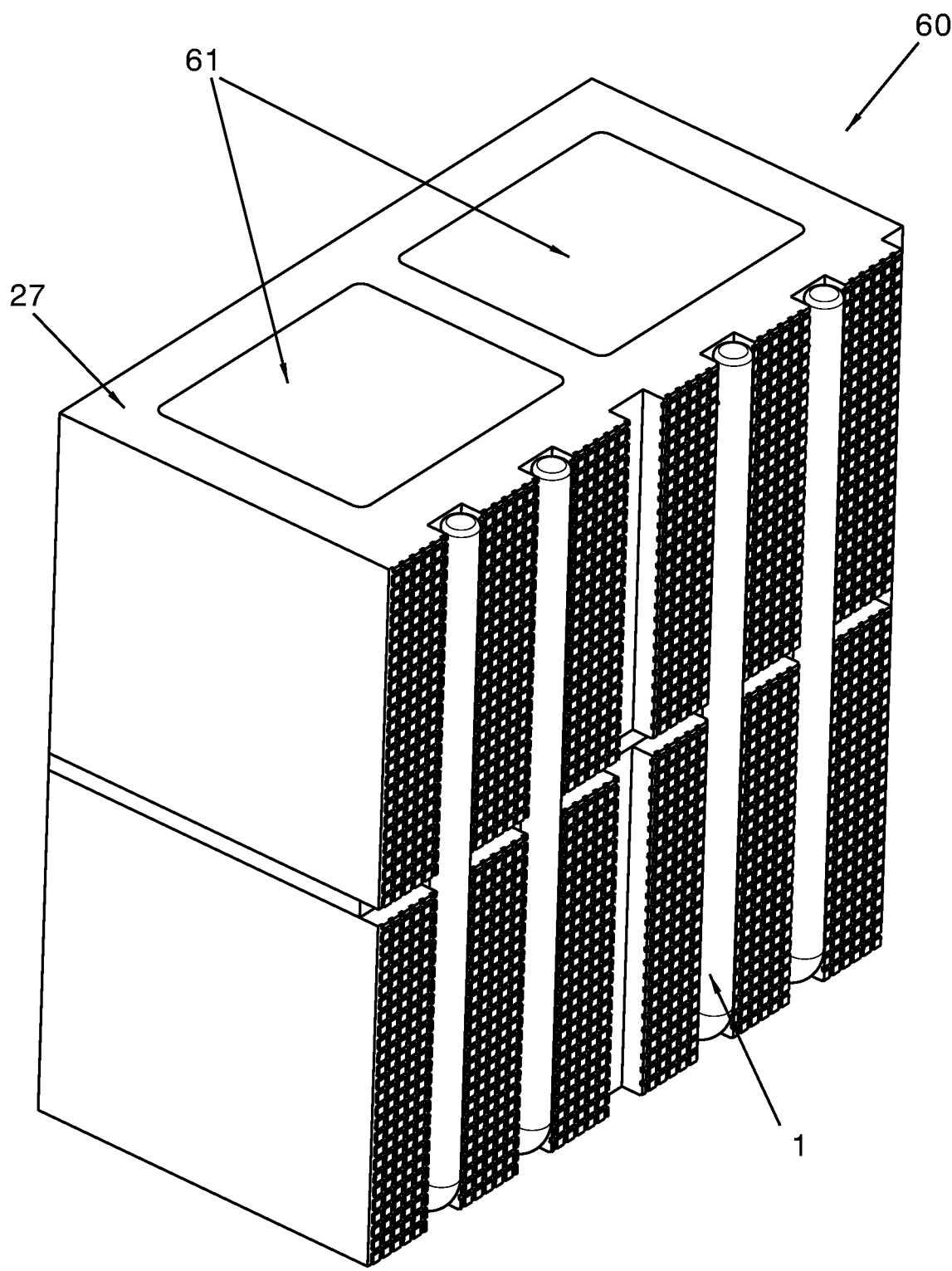
FIG. 11 is a drawing showing the heat transfer block of FIG. 5 fully filled with mortar.

With reference to FIG. 11 the second version of the heat transfer block, 60, is shown in a finished form by completely filling the openings in the double block assembly, 27, with mortar, 61, thereby enclosing the rear portion of the heat transfer device, 1, and providing a thermal path to the rear wall of the heat transfer block, 60.

Figure 12:
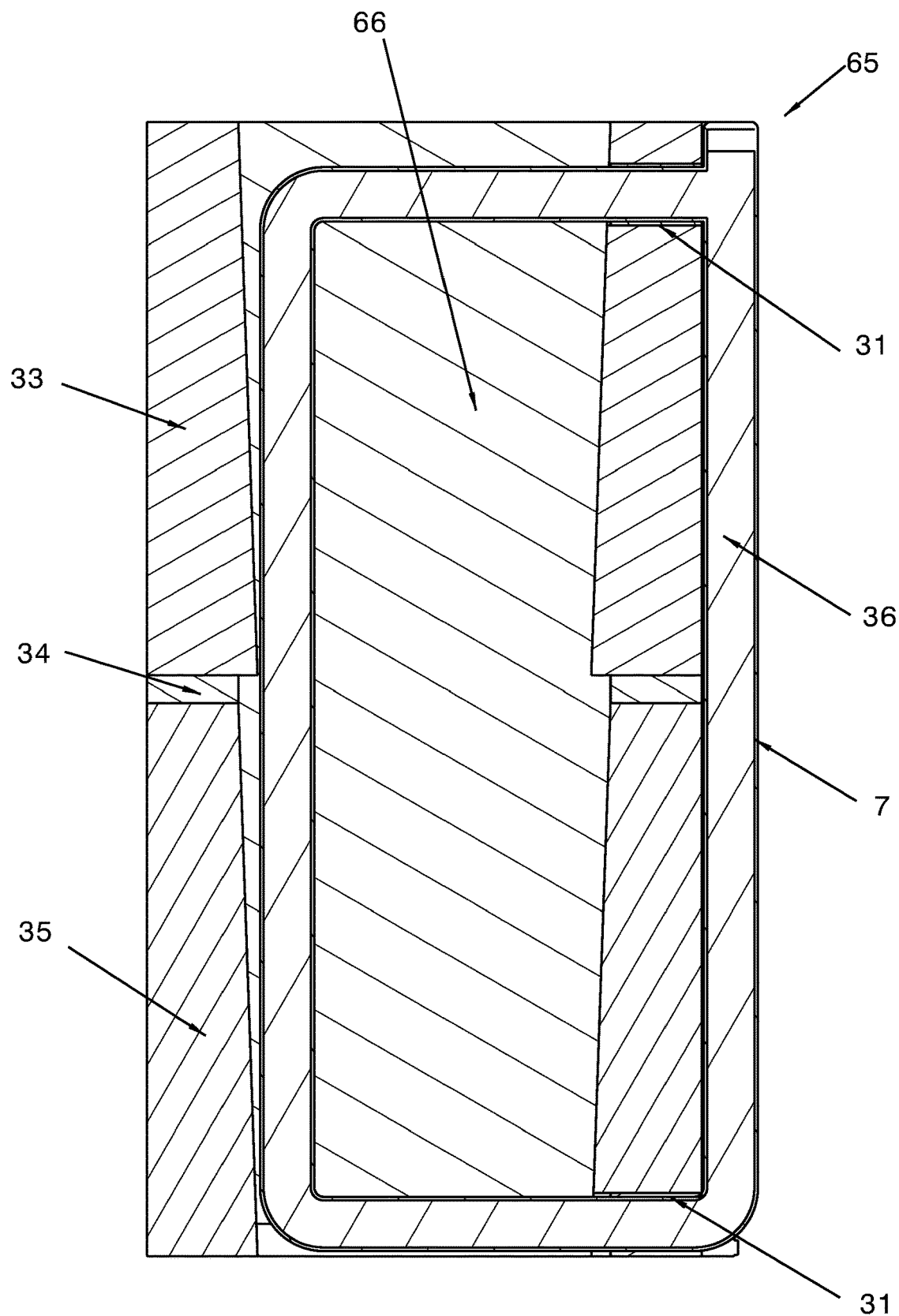
FIG. 12 is a cross section view of the heat transfer block of FIG. 11.

FIG. 12 shows a cross section, 65, through the heat transfer block, 50, of FIG. 11. In this cross section view, 65, the top block, 33, the mortar, 34, the bottom block, 35, the metal tube, 7, the fluid, 36, the upper flexible seal, 31, and the lower flexible seal, 32. Also shown is the full fill mortar, 66, against the front and back walls of the second version of the heat transfer block, 60.

Figure 13:
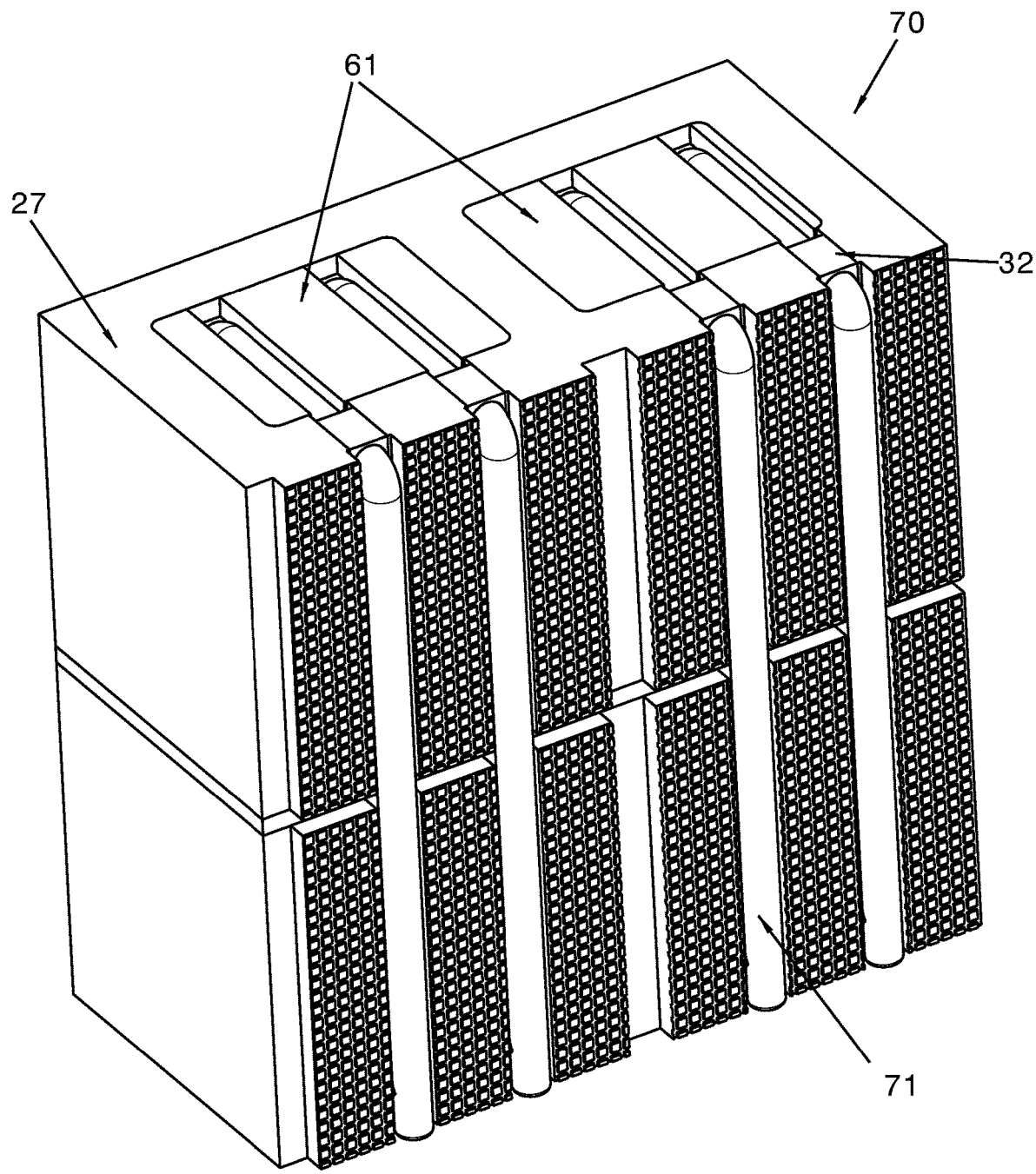
FIG. 13 is a drawing showing the heat transfer block of FIG. 11 with the heat transfer block turned upside down.

With reference to FIG. 13 the third version of the heat transfer block, 70, is shown in a finished form by completely filling the openings in the double block assembly, 27, with mortar, 61, thereby enclosing the rear portion of the heat transfer device, 1, and providing a thermal path to the rear wall of the heat transfer block, 60. In this third version of the heat transfer block, 70, the 4 heat transfer devices, 71, are mounted upside down when compared to the previous versions of the heat transfer block, this gives an advantage because a longer length of tubing with fluid in it is exposed to the sun.

Figure 14:
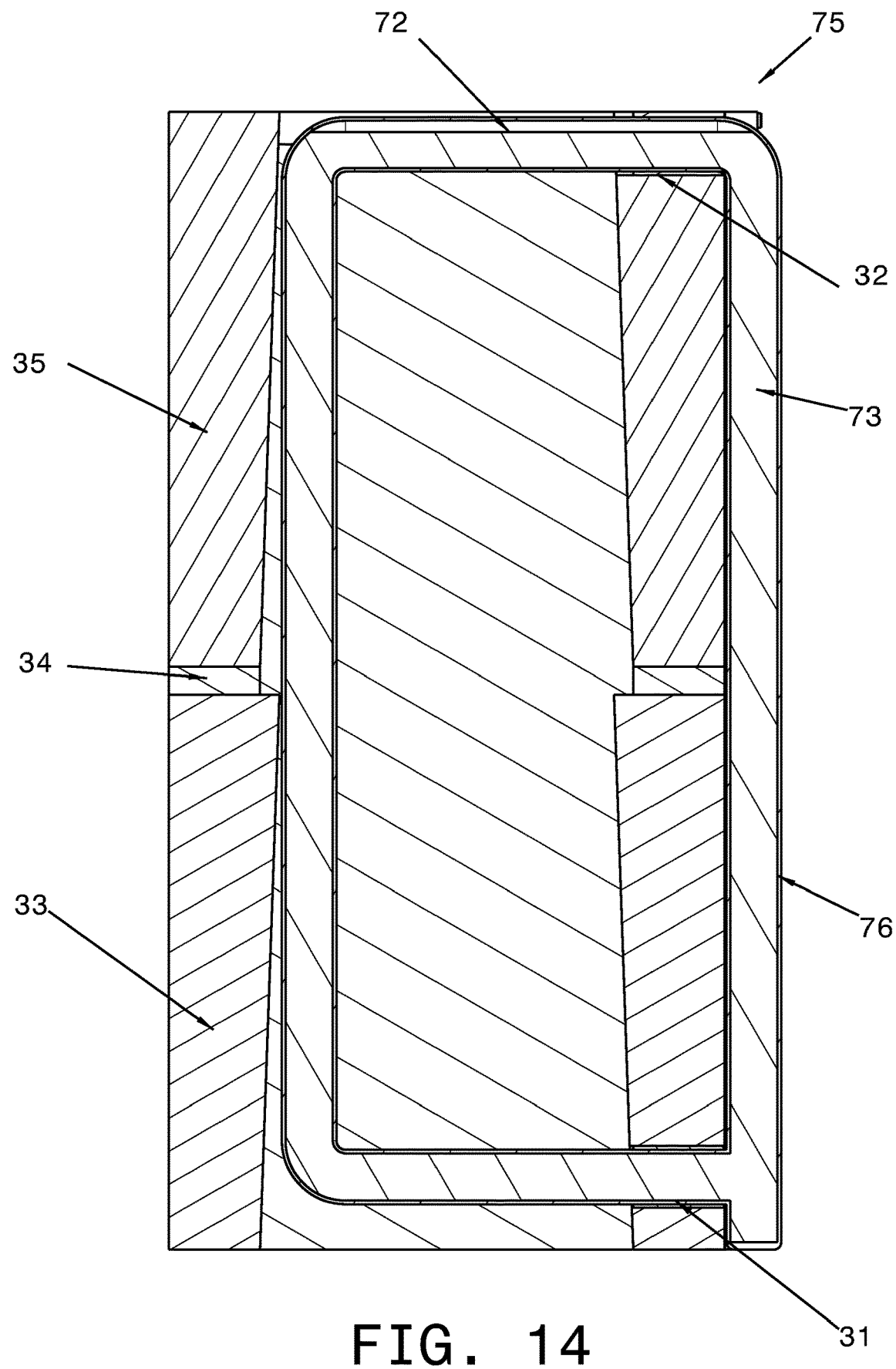
FIG. 14 is a cross section view of the heat transfer block of FIG. 13.

FIG. 14 shows a cross section, 75, through the heat transfer block, 70, of FIG. 13. In this cross section view, 75, the top block, 35, the mortar, 34, the bottom block, 33, the metal tube, 76, the fluid, 73, the upper flexible seal, 32, and the lower flexible seal, 31. Also shown is the full fill mortar, 77, against the front and back walls of the second version of the heat transfer block, 70. The provision for fluid expansion, is provided by the space, 72, above the fluid, 73.

Figure 15:
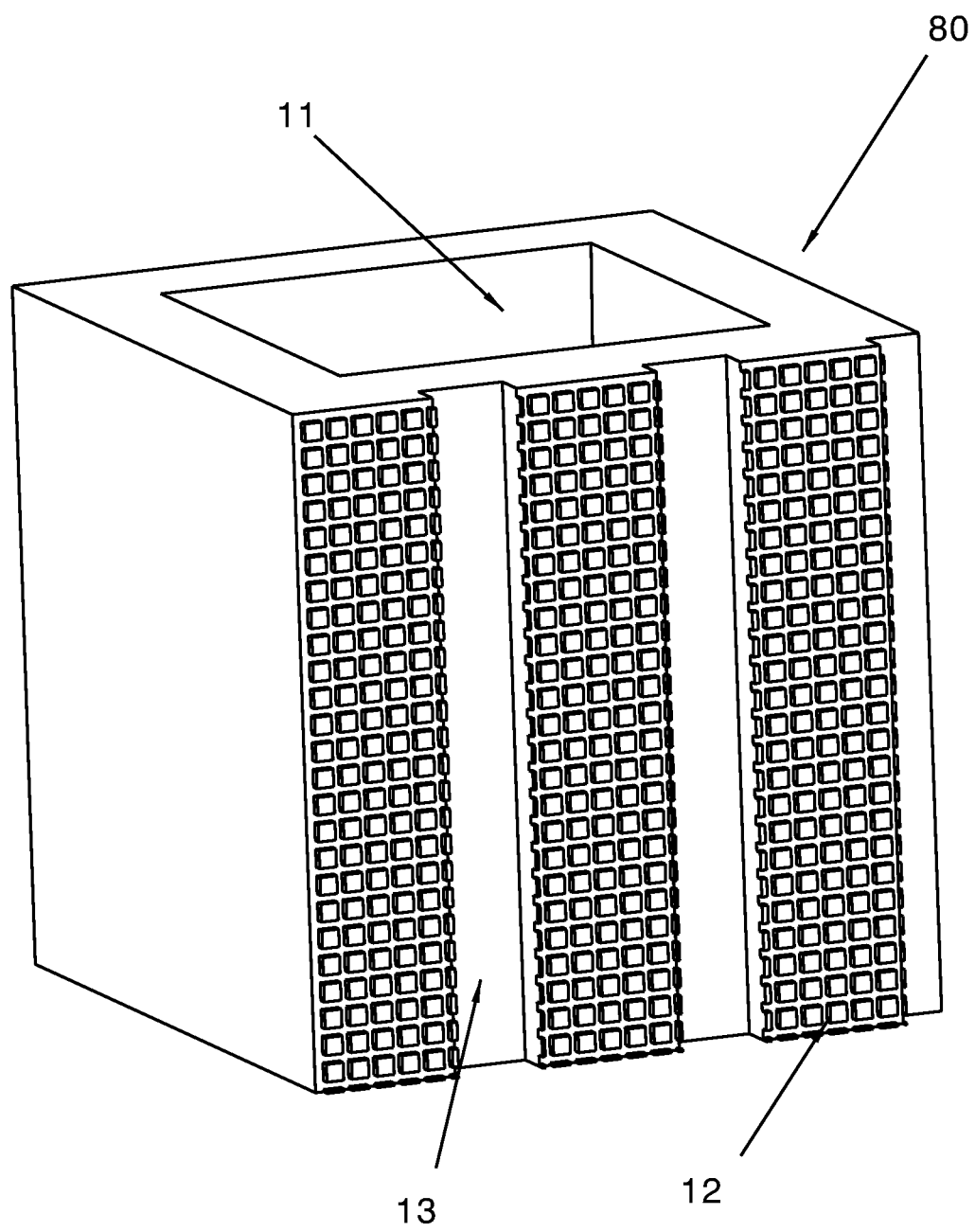
FIG. 15 is a drawing showing a half sized typical decorative concrete block.

With reference to FIG. 15, a typical half concrete decorative block, 80, is shown containing, a hollow section, 11, the front grooves, 13, and the textured surface, 12. Typically these decorative concrete blocks are a nominal 8 inches long by 8 inches high and 8 inches thick.

Figure 16:
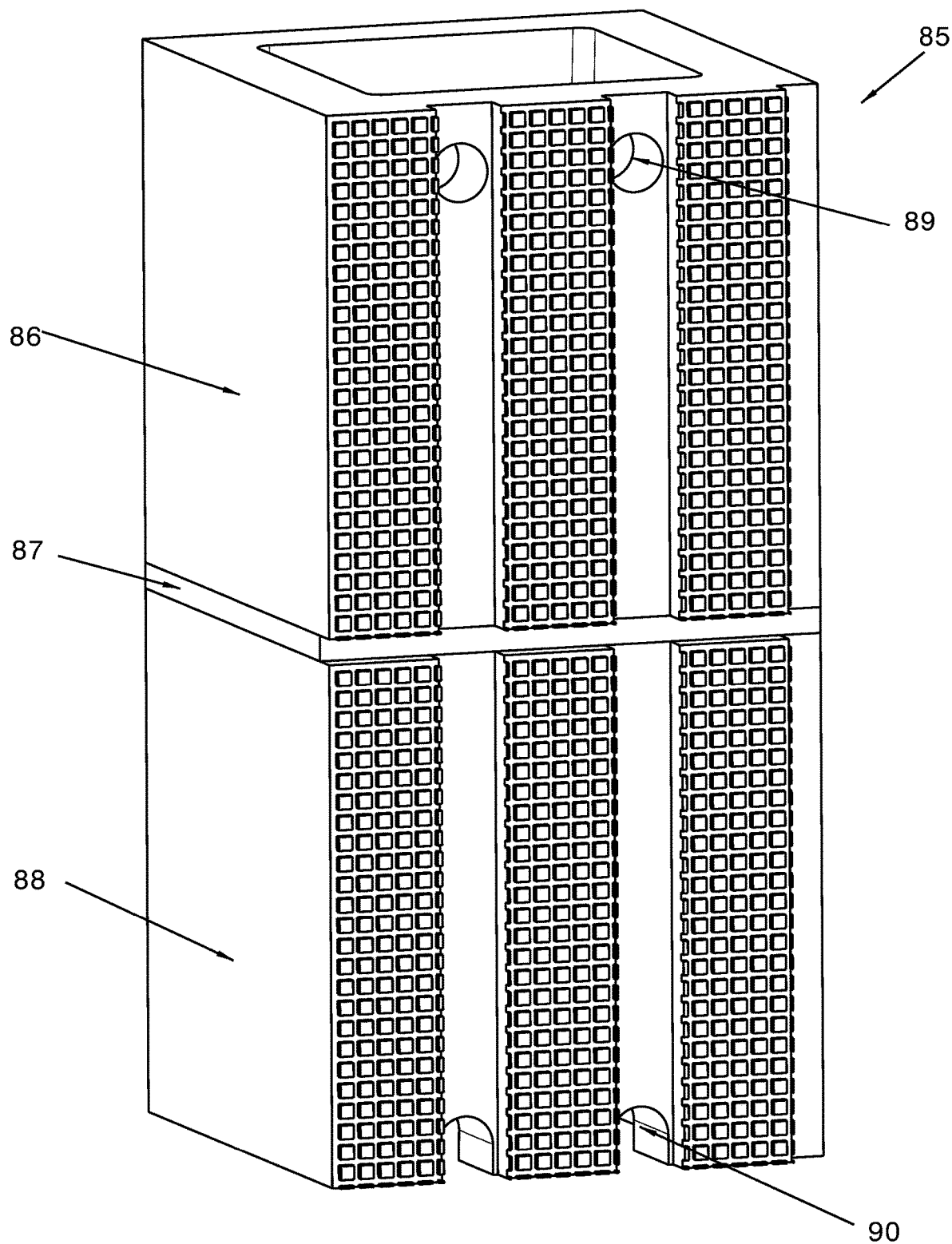
FIG. 16 is a drawing showing two of the typical half sized decorative concrete blocks of FIG. 15 joined together with holes to accommodate the tubing entry points.

FIG. 16 shows a double half block assembly, 85, this assembly consists of a top half block, 86, with holes, 89, drilled through the front wall of the block, 86, a mortar layer, 87, and a bottom half block, 88, with slots, 90, made through the front wall of the block, 88.

Figure 17:
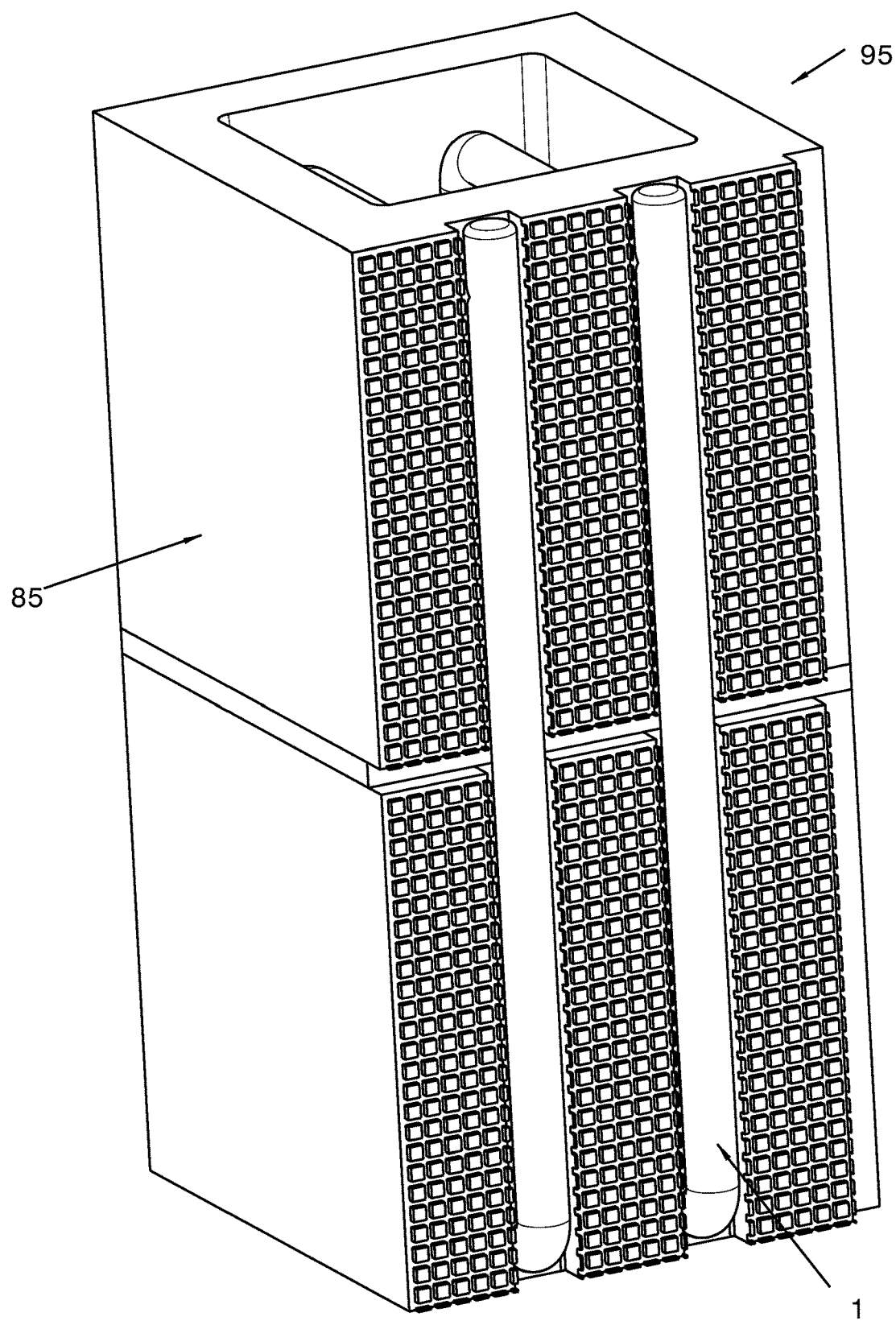
FIG. 17 is a drawing showing the combined typical decorative blocks of FIG. 16 that contain 2 the heat transfer devices of FIG. 1 forming a half sized heat transfer block.

With reference to FIG. 17 the assembly, 95, of the double half block assembly, 85, of FIG. 4, has 2 heat transfer devices, 1, installed in the double half block assembly, 85. The heat transfer devices, 1, are mounted such that they are located in the decorative grooves, very close to the bottom of the grooves.

Figure 18:
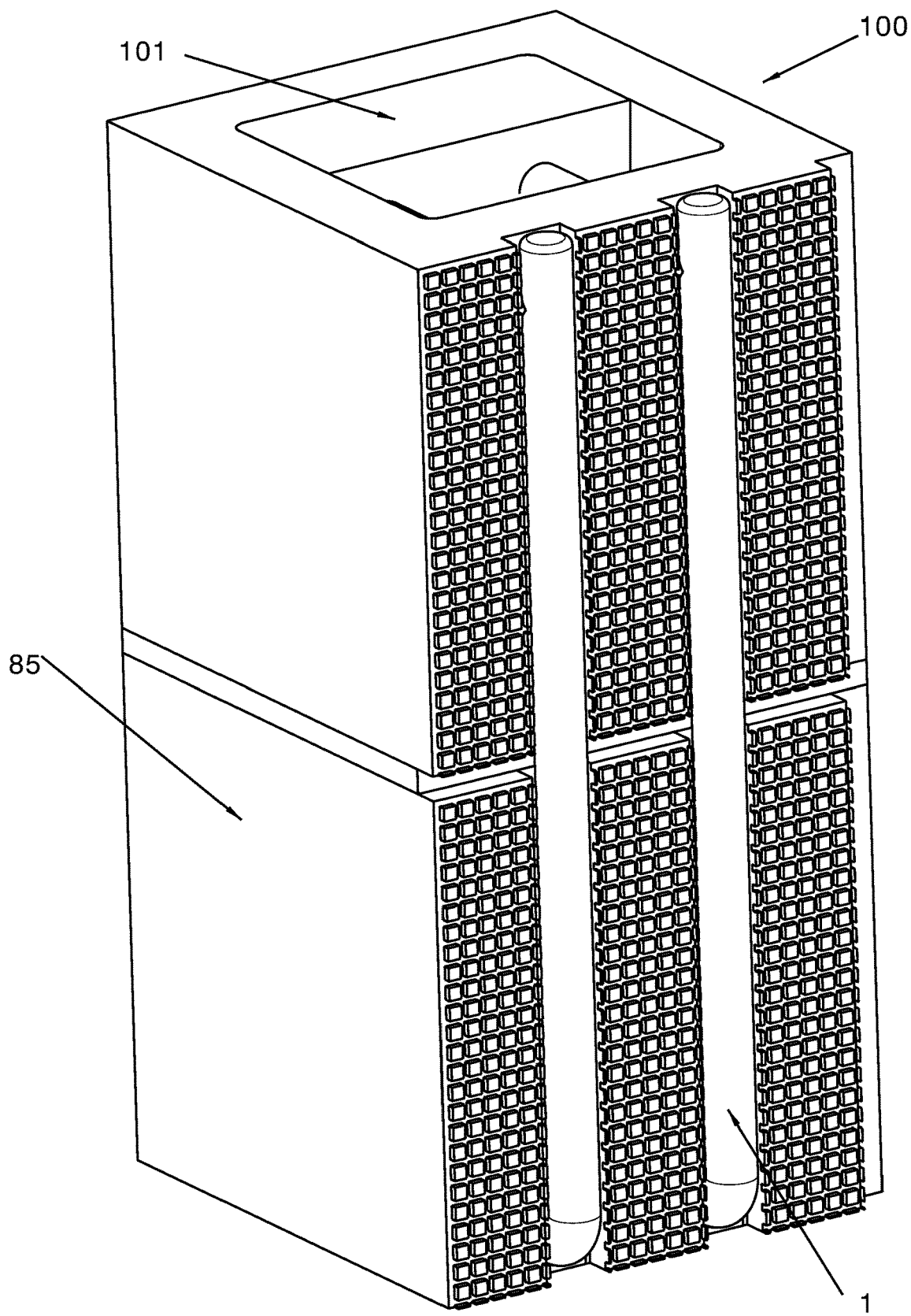
FIG. 18 is a drawing showing the half size heat transfer block of FIG. 17 partially filled with mortar.

With reference to FIG. 18 the first version of the heat transfer half block, 100, is shown in a finished form by partially filling the openings in the double block assembly, 81, with mortar, 101, thereby enclosing the rear portion of the heat transfer device, 1, and providing a thermal path to the rear wall of the heat transfer block, 85.

Figure 19:
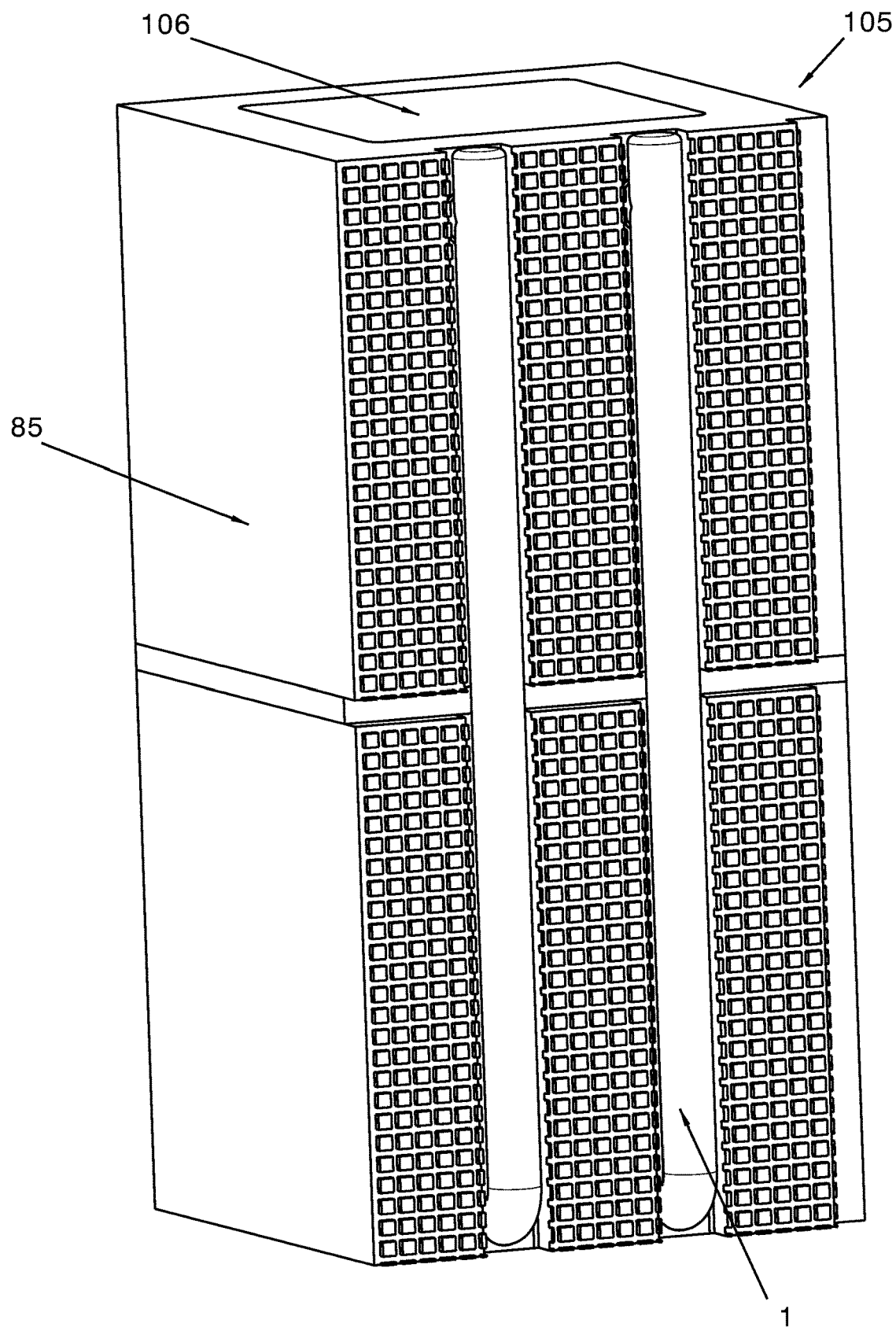
FIG. 19 is a drawing showing the half sized heat transfer block of FIG. 17 fully filled with mortar.

With reference to FIG. 19 the second version of the heat transfer half block, 105, is shown in a finished form by completely filling the openings in the double block assembly, 85, with mortar, 106, thereby enclosing the rear portion of the heat transfer device, 1, and providing a thermal path to the rear wall of the heat transfer block, 105.

Figure 20:
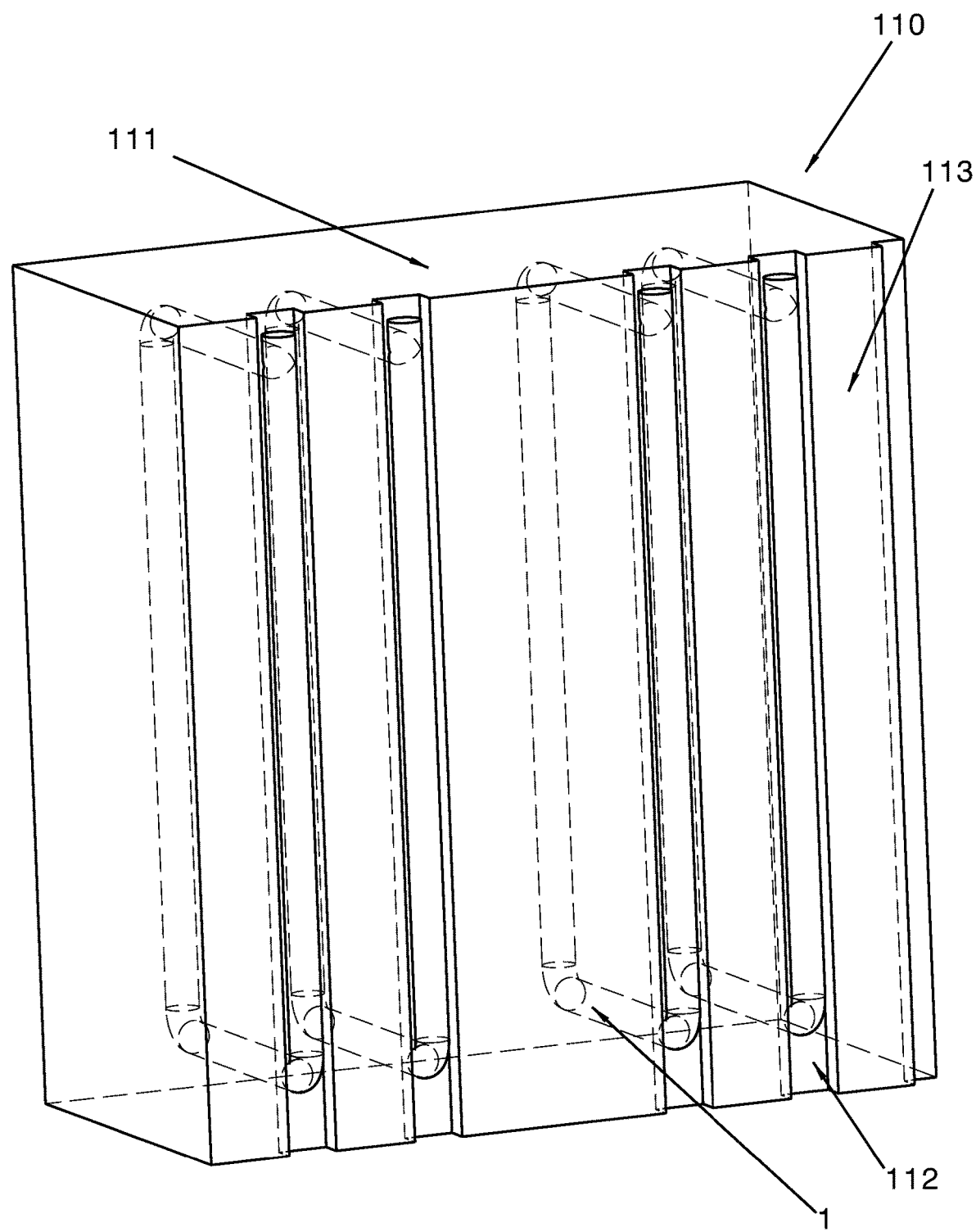
FIG. 20 is a drawing showing an alternate version of the heat transfer block wherein the body of the block is cast concrete.

With reference to FIG. 20 the fourth version of the heat transfer block, 110, is shown. This version of the heat transfer block, 110, consists of a concrete block, 111, which has 4 grooves, 112, and 5 faces, 113, also during the casting of the heat transfer block, 4 heat transfer devices, 1, are held in place while the concrete is poured and during its setting time.

Figure 21:
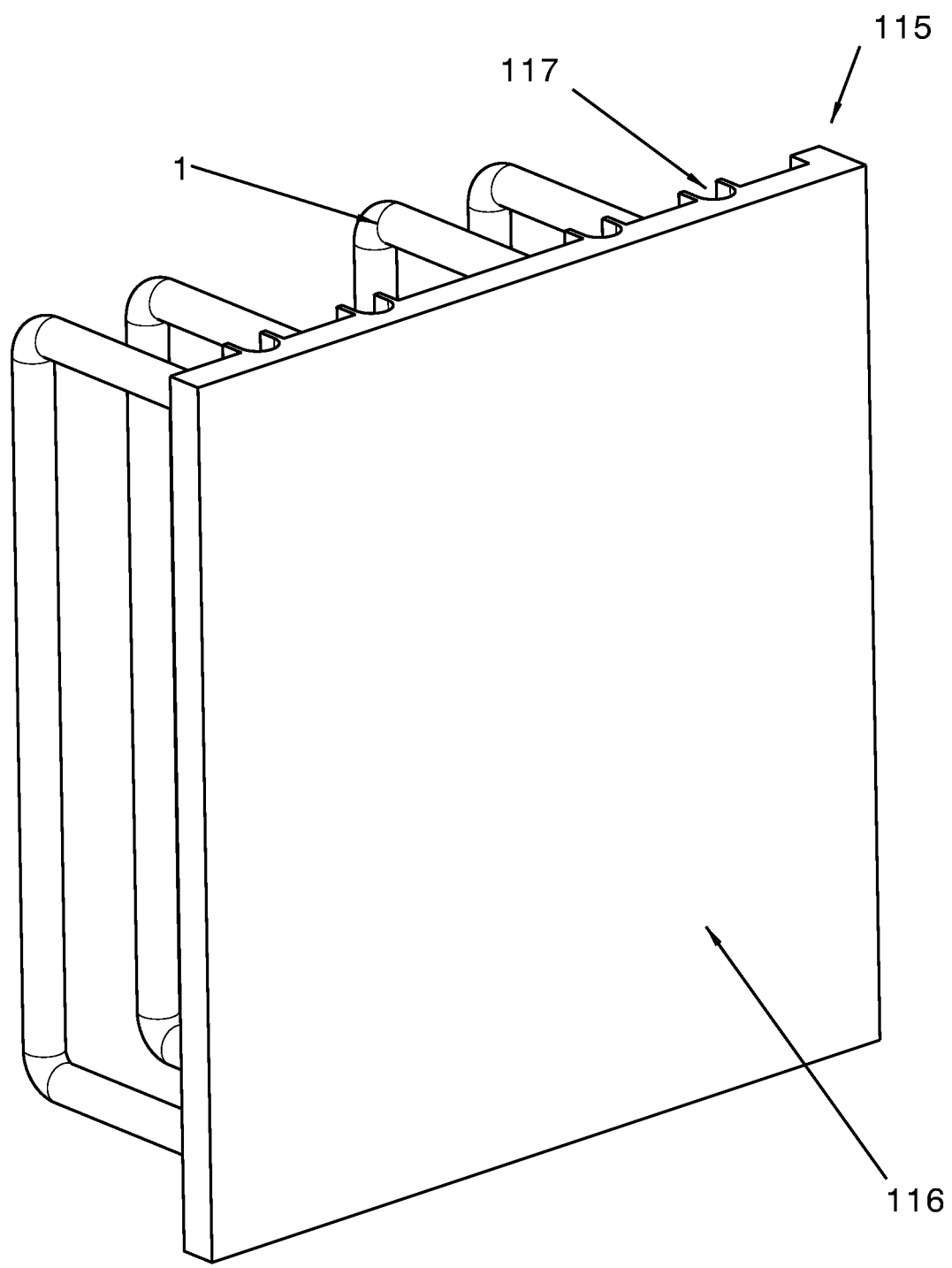
FIG. 21 is a drawing showing a wall of the mold used to cast the heat transfer block of FIG. 20 showing how the teat transfer devices of FIG. 1 are held in place during the casting process.

With reference to FIG. 21 an assembly, 115, of a front mold wall, 116, and 4 heat transfer devices, 1, of the mold wall assembly used to pour the heat transfer block, 110, of FIG. 20 is shown. The front wall, 116, has grooves, 117, that hold the 4 heat transfer devices, 1, in place during the pouring and setting of the concrete.

Figure 22:
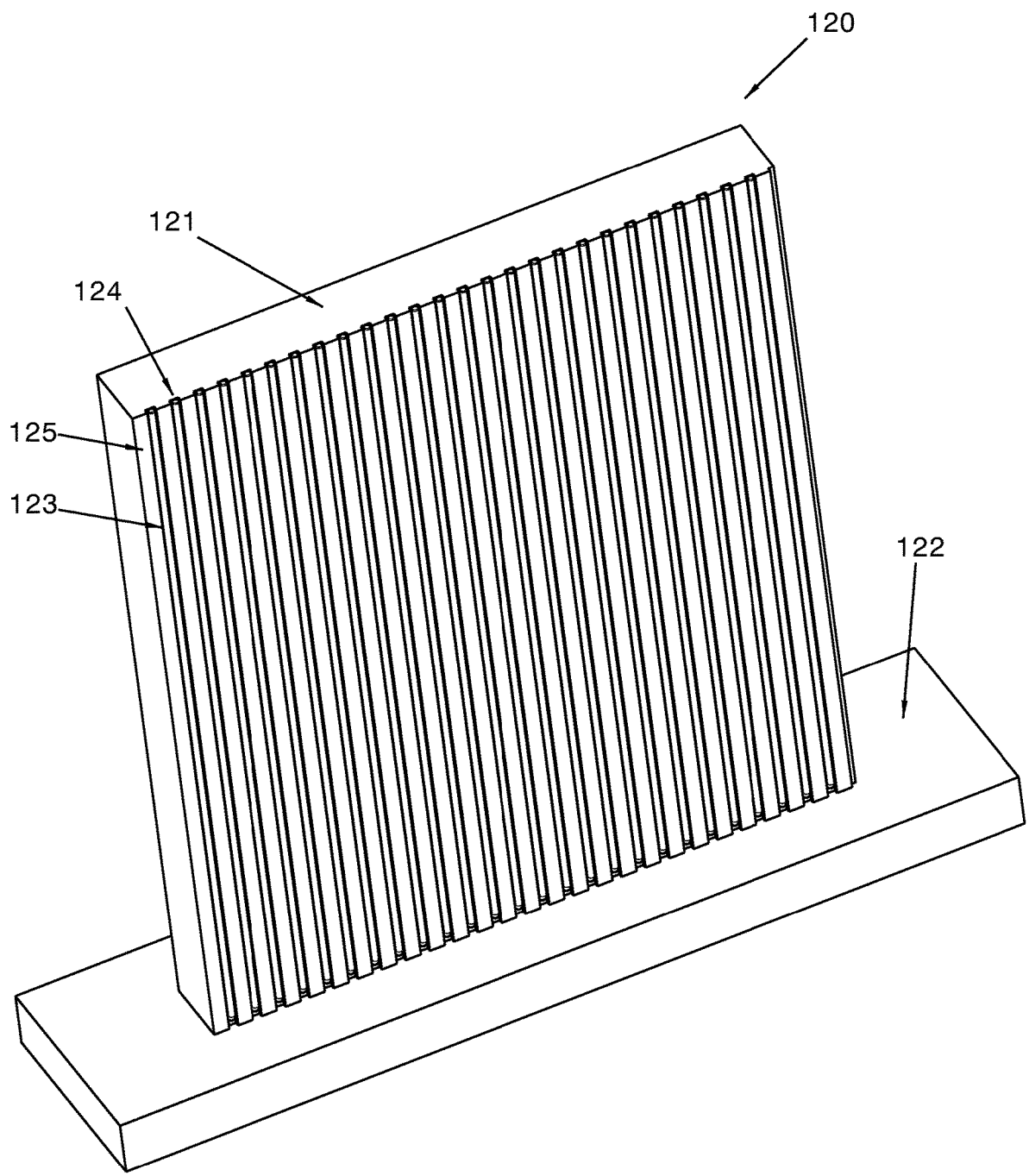
FIG. 22 is a drawing showing a wall that is cast with the heat transfer devices in place during the casting process, wherein the heat transfer devices are tall enough to cover the height of the wall.

With reference to FIG. 22 a poured concrete wall section, 120, of a poured concrete wall, 121, on a concrete foundation, 122, has grooves, 124, faces, 125, and very tall heat transfer devices, 124. During the pouring of the concrete wall, 121, a mold wall similar (but much larger) to the front mold wall, 116, of FIG. 21, is used to hold the heat transfer devices, 124, in place during the pouring and setting of the concrete.

Figure 23:
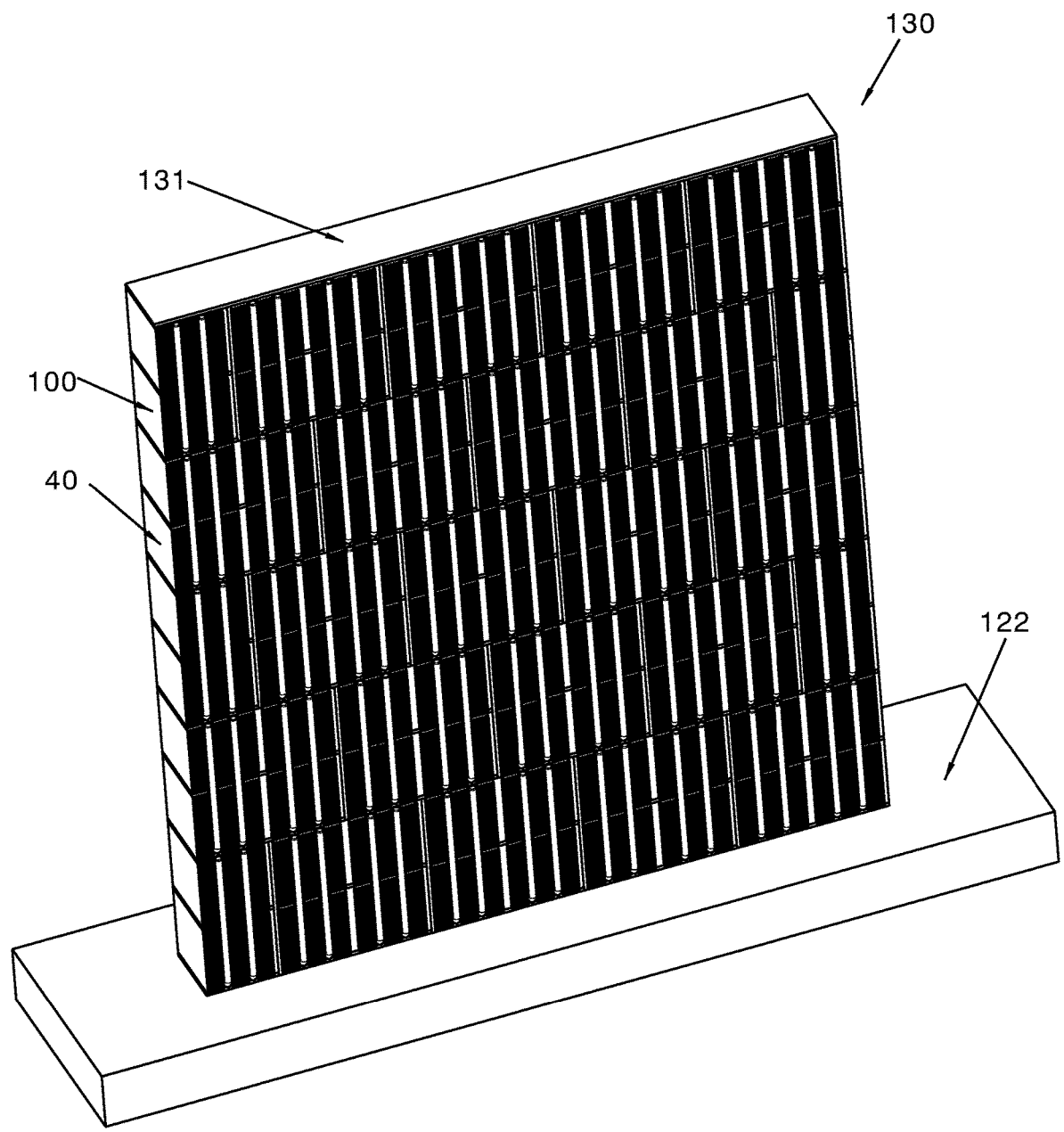
FIG. 23 is a drawing showing a wall that is made from the heat transfer devices of FIG. 11 and FIG. 19, joined through the use of mortar.

With reference to FIG. 23 a wall section, 130, is shown. The wall section consists of several of the first version of the heat transfer block, 40, and several of first version of the heat transfer half block, 100, joined by mortar, and sitting on top of a foundation, 122. The wall section, 130, is capped by a layer of mortar, 131.

Figure 24:
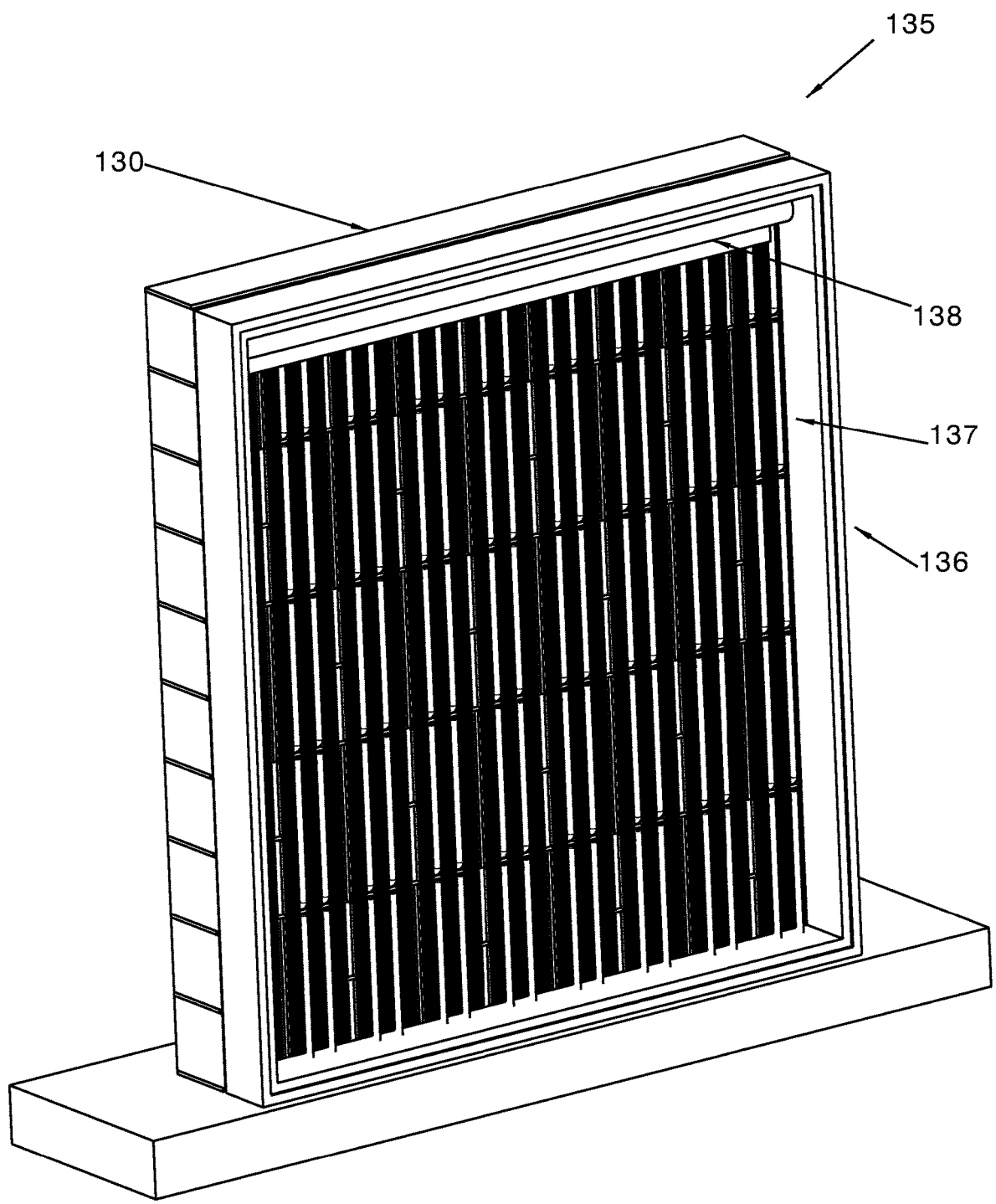
FIG. 24 is a drawing showing the wall of FIG. 23 with a rollup screen, in the up position, and a frame that holds a glass sheet in front of the wall.

With reference to FIG. 24 the wall section, 130, is shown on the foundation, 122, along with the glass frame, 136, and a glass panel, 137, behind which is mounted a motorized roll-up screen, 138, which is shown in the up position in this view, 135. The glass panel, 137, allows solar radiation to enter and fall on the wall section, 130, and prevents the escape of long wavelength light (infrared). The motorized roll-up screen, 138, is in the raised position as shown in view, 135, when solar radiation is present to heat the wall section, 130.

Figure 25:
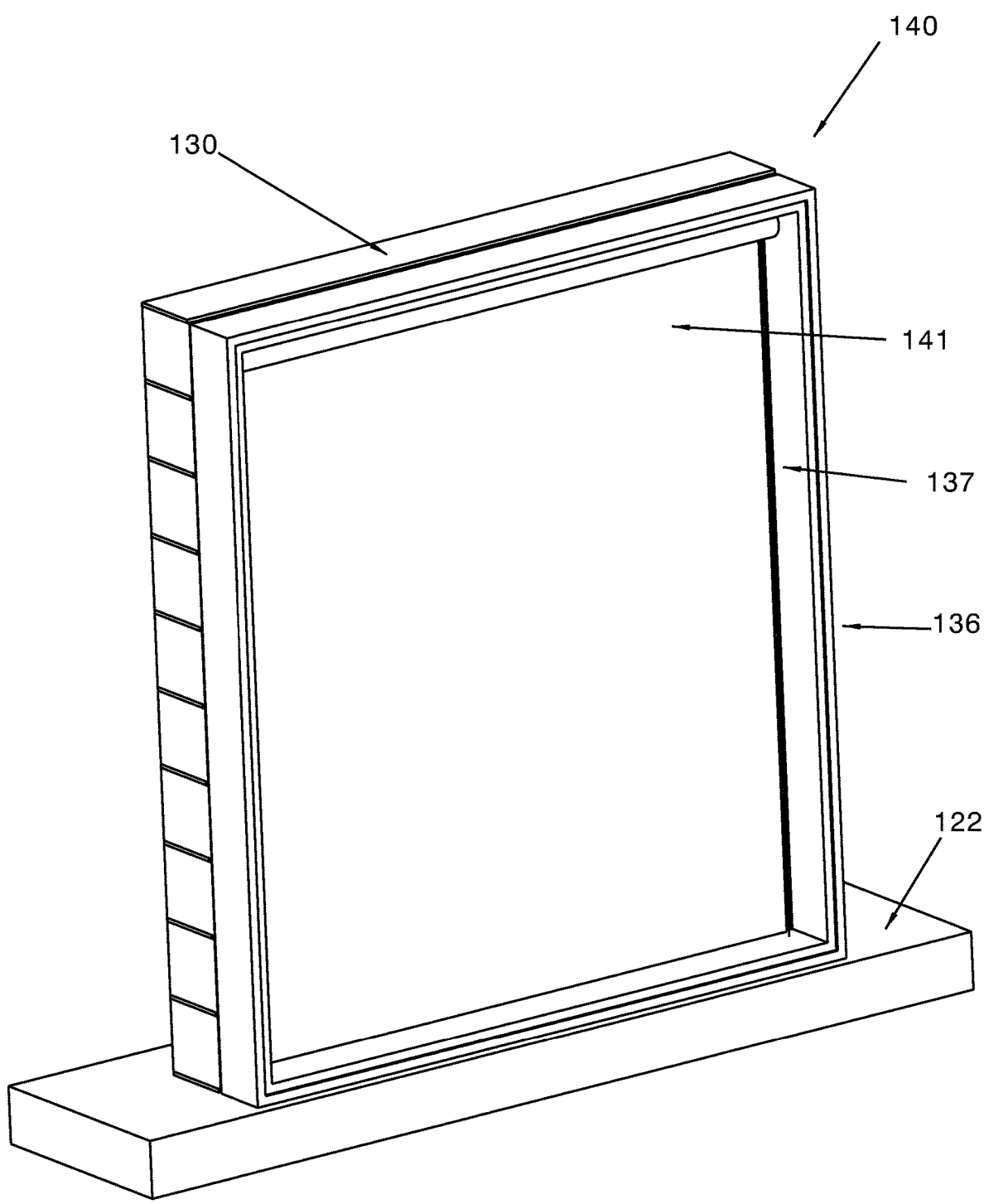
FIG. 25 is a drawing showing the wall of FIG. 23 with a rollup screen, in the down position, and a frame that holds a glass sheet in front of the wall.

With reference to FIG. 25 the wall section, 130, is shown on the foundation, 122, along with the glass frame, 136, and a glass panel, 137, behind which is mounted a motorized roll-up screen, 141, which is shown in the down position in this view, 140. The glass panel, 137, allows solar radiation to enter and fall on the wall section, 130, and prevents the escape of long wavelength light (infrared). The motorized roll-up screen, 141, is in the down position as shown in view, 140, when solar radiation is not present to heat the wall section, 130. The motorized roll-up screen, 141, is down at night and on days or times when there is insufficient solar radiation available.

Figure 26:
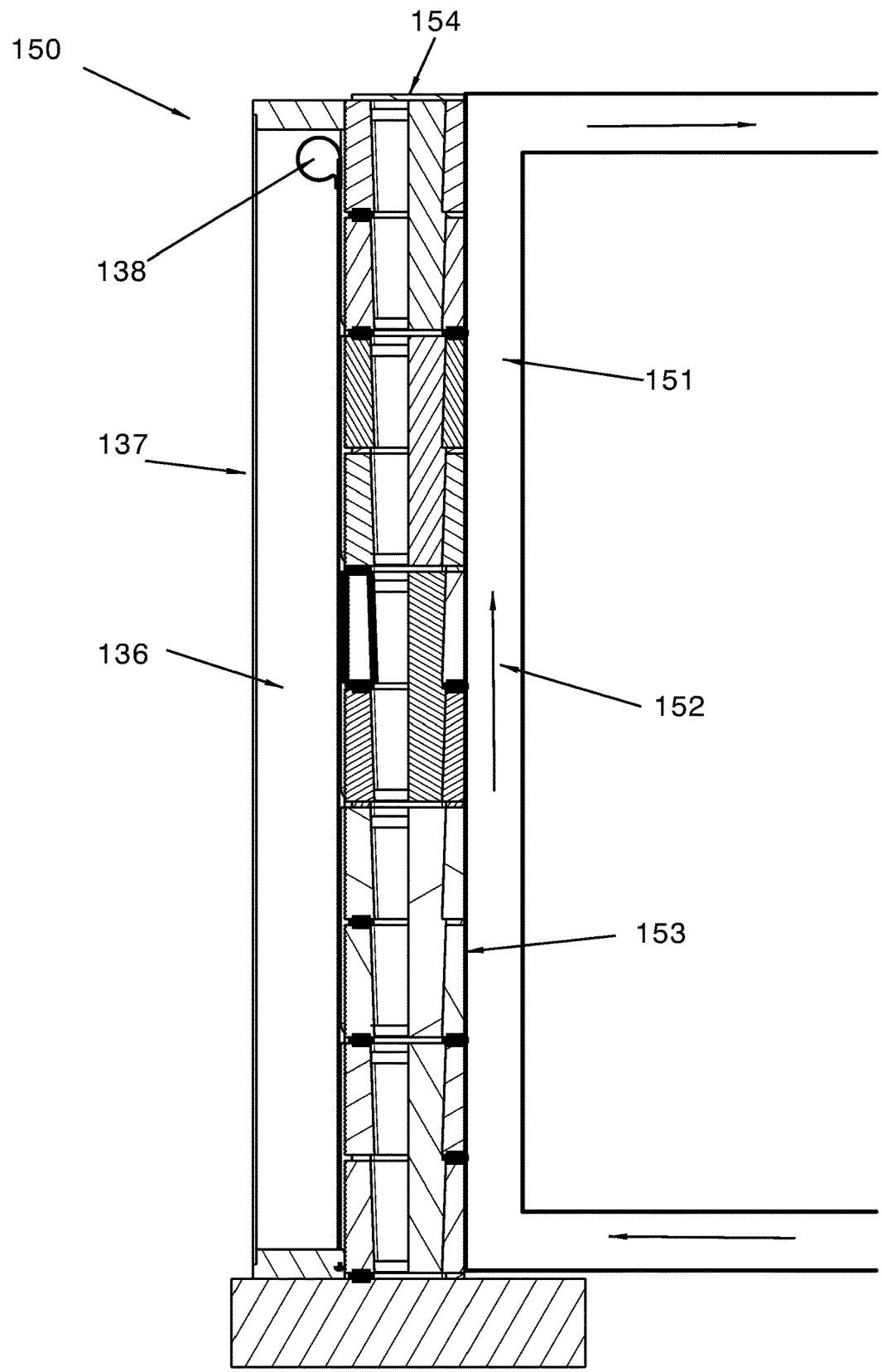
FIG. 26 is a cross section view of the wall of FIG. 24 with the ducting shown that is used to remove heat from the back of the wall.

FIG. 26 shows a cross section view, 150, through the wall section, 130, of FIG. 23. Visible in this view are: the wall section, 154, the heat transfer blocks, 50 and 100, the foundation, 122, along with the glass frame, 136, and a glass panel, 137, behind which is mounted a motorized roll-up screen, 138, which is shown in the up position, and the duct, 151. The duct, 151, has airflow, 152, coming from a fan (not shown), and then passes the airflow, 152, over the rear of the concrete, 153, in a vertical direction, then the heated airflow, 152, is sent off to a heat collection and storage system (not shown). Heat stored in the heat storage system, which could be stone rubble, a liquid, etc., for future use in heating.

Figure 27:
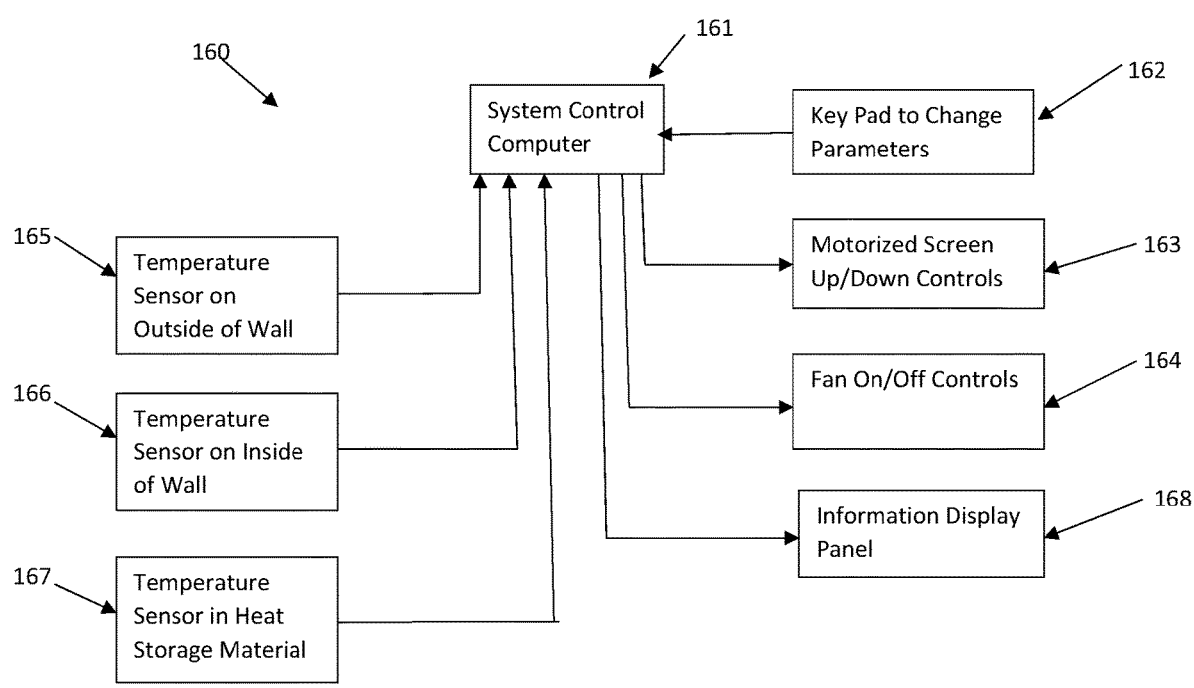
FIG. 27 is a drawing that shows a control system for the solar heat collection system.

With reference to FIG. 27 a control system, 160, is shown to control the operation of the solar heat collection system. The system control computer, 161, has the following inputs: key pad, 162, temperature sensor on outside of wall, 165, temperature sensor on inside of wall, 166, and temperature sensor in heat storage material, 167. The system control computer, 161, has the following outputs: information display panel, 168, motorized screen up/down signal, 163, and fan on/off signal, 164. The key pad, 162, can be used to enter information such as maximum heat storage material temperature, etc. The information display panel, 168, can display material storage temperature, outside wall temperature, inside wall temperature, fan on/off, motorized screen up/down, etc. Whenever the outside wall temperature is less than a preset temperature, the motorized screen will be lowered, and when the outside wall temperature is above that preset temperature, the motorized screen will be raised. Whenever the inside wall temperature is above the heat storage material temperature, the fan will be turned on, and whenever the inside wall temperature is below the heat material storage temperature, the fan will be turned off.

This invention has been described with reference to detailed descriptions of preferred embodiments. The details of the descriptions are given for the sake of explanation only and are not intended as limitations upon the scope and spirit of the appended claims.

What is claimed is:

1. Method of making a heat transfer device to increase the efficiency and quantity of heat transferred through a wall heated on one side by solar energy (sunlight), the method comprising:
   a) Providing a continuous loop of tubing with at least two horizontal and two vertical sections; and
   b) Providing a fluid that completely fills the continuous loop of tubing; and
   c) Providing a fluid expansion tubing portion connected to the continuous loop of tubing; and
   d) Providing at least one concrete block with an empty internal space surrounded by a plurality of walls; and
   e) Installing one or more of the continuous loop(s) of tubing inside a concrete block assembly of at least two of the concrete blocks, joined by mortar, such that the two horizontal tubing sections pass through holes in one wall of the concrete block assembly and one of the vertical tubing sections is outside of the concrete block assembly and exposed to direct sunlight; and
   f) Providing vertical grooves on an outer surface of the concrete blocks that partially enclose the vertical tubes located outside of the concrete block assembly; and
   g) Partially filling the internal spaces of the concrete blocks of the concrete block assembly, thereby enclosing the other vertical tube in mortar;

wherein heat is transferred from the sunlite side of the heat transfer device to the opposite side of the heat transfer device by movement of the fluid in the continuous loop of tubing.

2. The heat transfer device of claim 1 where a flexible seal is provided between the horizontal tubes and the holes in the concrete block wall that they pass through.

* * * * *